United States Patent
Claes

(10) Patent No.: US 9,525,549 B2
(45) Date of Patent: *Dec. 20, 2016

(54) METHOD AND APPARATUS FOR SECURING A MOBILE APPLICATION

(71) Applicant: VASCO DATA SECURITY, INC., Oakbrook Terrace, IL (US)

(72) Inventor: Mathias Claes, Sint-Pieters-Leeuw (BE)

(73) Assignee: VASCO DATA SECURITY, INC., Oakbrook Terrace, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/982,147

(22) Filed: Dec. 29, 2015

(65) Prior Publication Data

US 2016/0191244 A1  Jun. 30, 2016

Related U.S. Application Data

(60) Provisional application No. 62/097,376, filed on Dec. 29, 2014.

(51) Int. Cl.
| | |
|---|---|
| *H04L 29/06* | (2006.01) |
| *H04L 9/32* | (2006.01) |
| *G06F 21/45* | (2013.01) |

(52) U.S. Cl.
CPC ............. *H04L 9/3213* (2013.01); *G06F 21/45* (2013.01); *H04L 9/3234* (2013.01); *H04L 9/3247* (2013.01); *H04L 63/0838* (2013.01); *H04L 63/123* (2013.01); *H04L 63/0435* (2013.01); *H04L 63/0853* (2013.01)

(58) Field of Classification Search
CPC .... H04L 9/0819; H04L 9/0838; H04L 9/0861; H04L 9/0863; H04L 9/0869; H04L 9/0877; H04L 9/3213; H04L 9/3228; H04L 9/3234; H04L 9/3247; H04L 63/0435; H04L 63/0838; H04L 63/0853; H04L 63/123; G06F 21/34; G06F 21/45

See application file for complete search history.

(56) References Cited

U.S. PATENT DOCUMENTS

| | | | | |
|---|---|---|---|---|
| 8,312,519 | B1* | 11/2012 | Bailey | H04L 9/003 380/255 |
| 8,812,860 | B1* | 8/2014 | Bray | G06F 21/34 713/182 |
| 9,071,424 | B1* | 6/2015 | Bowness | H04L 9/0838 |
| 9,203,620 | B1* | 12/2015 | Nystrom | H04L 9/0894 |
| 2014/0281506 | A1* | 9/2014 | Redberg | H04L 63/067 713/159 |

* cited by examiner

*Primary Examiner* — Minh Dinh
(74) *Attorney, Agent, or Firm* — RatnerPrestia

(57) ABSTRACT

Methods, apparatus, and systems for personalizing a software token using a dynamic credential (such as a one-time password or electronic signature) generated by a hardware token are disclosed.

7 Claims, 3 Drawing Sheets

METHOD AND APPARATUS FOR SECURING A MOBILE APPLICATION

CROSS REFERENCE TO RELATED APPLICATIONS

This application claims priority to U.S. Provisional application Ser. No. 62/097,376 entitled Method and Apparatus for Securing a Mobile Application, filed on Dec. 29, 2014, the contents of which are incorporated fully herein by reference.

FIELD OF THE INVENTION

The invention relates to securing remote access to computers and applications and remote transactions over computer networks. More specifically, the invention relates to methods and systems for personalizing a software token.

BACKGROUND OF THE INVENTION

As remote access of computer systems and applications grows in popularity, the number and variety of transactions which are accessed remotely over public networks such as the Internet has increased dramatically. This popularity has underlined a need for security; in particular: how to ensure that people who are remotely accessing an application are who they claim they are, how to ensure that transactions being conducted remotely are initiated by legitimate individuals, and how to ensure that transaction data has not been altered before being received at an application server.

One solution to secure the interaction of users with computer based applications is the usage of hardware strong authentication tokens for generating one-time passwords (OTP) and/or electronic signatures.

Hardware strong authentication tokens are dedicated devices that only serve to generate OTPs and/or electronic signatures using a cryptographic algorithm that is parameterized with a secret cryptographic key. While the algorithm of tokens belonging to different users is often the same for a large number of tokens, the secret cryptographic key that is used by a particular token associated with a particular user will typically be different from the secret keys used by other tokens that are associated with other users to ensure that different tokens (associated with different users) will generate different OTPs and different electronic signatures. In other words, even if many tokens may be adapted to offer the same functionality using the same algorithm, each token is usually personalized with at least a different secret key value that parameterizes the algorithm for generating OTPs and/or electronic signatures, and whereby different users may be associated with different values of the secret key.

Users have to make sure that they have their token with them wherever they happen to be when they want to access the application. In some cases users may perceive this as inconvenient. One possible alternative for dedicated hardware tokens is the usage of software tokens. Software tokens, or "soft tokens", are software applications that are capable of emulating the functionality of hardware strong authentication tokens (i.e. the generation of OTPs and electronic signatures). Soft tokens typically run on a personal computing device that belongs to a user and that is capable of running various software applications. Usually these computing devices are not dedicated to one single particular computing task but may comprise a general purpose computing platform that may be adapted to receive extra software applications in the course of their life cycle depending on the needs of the user. Smartphones are examples of personal computing devices upon which software tokens can be installed and that users generally tend to have with them at all times. Tablet computers may be another example of personal computing devices upon which software tokens may be installed.

Since a software token is a piece of software that runs on a general purpose computing device, it is a challenge to personalize a software token installed on a personal computing device of a given user i.e. to provide the software token with a set of data (including for example the secret key that the software token will use for cryptographically generating credentials on behalf of the user) having values that are specific for that individual software token instance and that may be associated with the intended user of the software token.

Software tokens and hardware tokens may in this description be collectively referred to as authentication tokens.

What is needed is a secure yet convenient solution for the personalization of a software token.

DISCLOSURE OF THE INVENTION

The invention is based on an insight of the inventors that the usage of software tokens doesn't exclude that users may still have hardware tokens whereby a hardware token and a software token associated with the same user may be used for complementary tasks. For example a software token may be used to ensure mobility for day-to-day low and medium risk transactions, whereas hardware tokens may be used for more exceptional tasks requiring a higher level of security.

The invention is further based on another insight of the inventors that a user may use his or her hardware token in a process to securely and conveniently personalize a software token.

In this description the terminology 'personalizing a token' may refer to the process of providing specific values to a set of data elements that are used by a specific token whereby these specific values may be unique for that particular token with respect to other similar tokens. For example in some embodiments personalizing a particular token may include providing a specific value to the secret cryptographic key that the particular token may use to generate for example OTPs and/or electronic signatures whereby that value may be unique for that particular token. The terminology 'unique' may in this context refer to absolute uniqueness (i.e. it is guaranteed that the same value will only occur at most in one token) or may refer to statistical or probabilistic uniqueness (i.e. knowledge about the value for one particular token doesn't provide any knowledge about the possible values of any other token; in other words it may not in principle be excluded that two tokens may end up with the same value but if that happens then this is not predictable and would seem to be the result of coincidence at least from the point of view of an outside party). The process of personalizing a particular token may comprise the steps of choosing or determining the actual specific values for the above mentioned set of data elements for that particular token and/or providing these specific values to that particular token and/or loading these specific values into that particular token. Unless otherwise specified, in this description values of data elements that have been personalized for a particular token are stored by the token in a non-volatile memory accessible by the token for future use e.g. for generating dynamic credentials. After having been personalized, a personalized token may use the stored personalized data elements for an indeterminate number of times and for an indeterminate time period.

Obtaining a software token.

In some embodiments a user may obtain a software token by installing a software token application on a personal computing device (such as for example a smartphone or a tablet computer) belonging to the user. In some embodiments the software token application may be downloaded and installed just like any other application for the personal computing device. For example in some embodiments the software token may be installed, e.g. on a smartphone, as an extra token app that may be downloaded from a general app store.

The functioning of a software or hardware token.

In some embodiments a token, such as the software token and/or the hardware token, may be adapted to generate a one-time password (OTP) or an electronic signature by cryptographically combining the value of a dynamic variable with the value of a secret cryptographic key using a cryptographic algorithm that is parameterized with the secret cryptographic key. In some embodiments the dynamic variable may be a function of a time value (that may for example be provided by a clock of the token or the personal computing device on which the software token may be running). In some embodiments the dynamic variable may be a function of the value of an event related variable. In this description the terminology event related variable may refer to a variable the value of which may be automatically updated using an update algorithm upon the occurrence of a specific event. In some embodiments the specific event may for example comprise the usage by the token of the event related variable to generate an OTP or electronic signature. In some embodiments the event related variable may comprise a counter and the update algorithm may comprise the monotonic incrementing (or decrementing) of the counter. In some embodiments the update algorithm may comprise for example a one-way hashing algorithm and the event related variable may be updated with a new value that is obtained as the result of applying the one-way hashing algorithm to an old value (e.g. the current value before the update) of the event related variable. In some embodiments the event related variable may comprise the secret cryptographic key. For example in some embodiments the value of the secret cryptographic key may be updated with a new value, that may be a function of a previous value of the secret cryptographic key, each time the secret cryptographic key is used to generate an OTP or electronic signature. Or the secret cryptographic key may for example be a function of a dynamic variable. For example that secret cryptographic key may be derived from a fixed master key and the value of a dynamic variable such as a time or counter value. Or the secret cryptographic key may for example be a function of a state variable and the value of the state variable may be updated with a new value, that may be a function of a previous value of the state variable, for example each time the secret cryptographic key is used to generate an OTP or electronic signature. In some embodiments the dynamic variable may be based on a challenge that may for example be generated by a server and that may for example be provided to the token (e.g. by the user entering the challenge using a user input interface of the computing device the soft token is running on). In some embodiments the dynamic variable may be based on transaction data that may be provided to the token (e.g. by the user entering the transaction data using a user input interface of the token or of the computing device the software token is running on). In some embodiments more than one dynamic variable may be used.

For example in some embodiments both an internal dynamic variable, such as a time variable or an event related variable, and an external dynamic variable, such as a challenge or transaction data, may be used in the cryptographic combination.

The result of the cryptographic combination of the value of the dynamic variable with the value of the secret cryptographic key may be in general referred to as a dynamic credential. In case the dynamic variable is based on transaction data the result of the cryptographic combination of the value of the dynamic variable with the value of the secret cryptographic key may be referred to as an electronic signature. In case the dynamic variable is based on a challenge the result of the cryptographic combination of the value of the dynamic variable with the value of the secret cryptographic key may be referred to as a response. In case the dynamic variable is based on a time value or on the value of an event related variable the result of the cryptographic combination of the value of the dynamic variable with the value of the secret cryptographic key may be referred to as a one-time password (OTP).

In some embodiments the cryptographic algorithm for cryptographically combining the value of the dynamic variable and the value of the secret cryptographic key may comprise a symmetric cryptographic algorithm that may be parameterized by the secret cryptographic key, and the software token may share the secret cryptographic key with for example an authentication server. For example in some embodiments the symmetric cryptographic algorithm may comprise a symmetric encryption or decryption algorithm such as AES (Advanced Encryption Standard) that may operate on the value of the dynamic variable and that may be parameterized with the secret cryptographic key. In some embodiments the symmetric cryptographic algorithm may comprise a keyed hashing algorithm such as HMAC (Hash-based Message Authentication Code) that may operate on the value of the dynamic variable and that may be parameterized with the secret cryptographic key. In some embodiments the symmetric cryptographic algorithm may be parameterized with the secret cryptographic key and may operate on the value of the dynamic variable. In some embodiments the secret cryptographic key may comprise or may be a function of a first dynamic variable, and the symmetric cryptographic algorithm may be parameterized with the secret cryptographic key and may operate on a second dynamic variable and/or on a fixed value.

In some embodiments the cryptographic algorithm for generating the dynamic credential by cryptographically combining the value of the dynamic variable and the value of the secret cryptographic key may be irreversible in the sense that, with respect to the value of the dynamic variable it may be a one-way function i.e. that even when the value of the generated dynamic credential is known, the generation algorithm is known and the values of all other parameters and data elements that have been used for generating the dynamic credential are also known, then it is still impossible or computationally infeasible to unambiguously determine the value of the dynamic variable that was effectively used in generating the dynamic credential. For example in some embodiments cryptographically combining the value of the dynamic variable and the value of the secret cryptographic key may comprise applying a keyed hashing algorithm such as HMAC operating on the value of the dynamic variable and parameterized with the secret cryptographic key. Or the dynamic credential may be generated by encrypting the dynamic variable with a symmetric block cipher parameterized with the secret cryptographic key whereby a substantial part of the resulting cryptogram may be truncated. For example in some embodiments not more than half of the resulting cryptogram may be included in the dynamic credential.

Validation or verification of a dynamic credential.

In some embodiments a dynamic credential generated by an authentication token may be received and verified or validated by an authentication server. The authentication server may retrieve a copy of the secret cryptographic key that was used by the authentication token to generate the dynamic credential, and use that retrieved copy of the secret cryptographic key to parameterize a cryptographic verification or validation algorithm for verifying or validating the received dynamic credential. For example, in some embodiments the authentication server may use the retrieved copy of the secret cryptographic key to generate one or more reference values for the dynamic credential and compare the received dynamic credential to the one or more reference values wherein the verification or validation of the received dynamic credential is successful if the received dynamic credential matches at least one of the reference values. In some embodiments the authentication server may generate the reference values for the dynamic credential by obtaining one or more possible values for the dynamic variable and generating a reference value for the dynamic credential for each of the obtained possible values for the dynamic variable by cryptographically combining each possible value for the dynamic variable with the retrieved copy of the secret cryptographic key.

Personalizing the Secret Cryptographic Key of a Software Token

In some embodiments after the software token has been installed on a personal computing device of the user it may initially be in a non-personalized state whereby the secret cryptographic key does not yet have a value. To get the software token into an operational state wherein the software token can be used by the user to generate valid OTPs and/or electronic signatures, the software token may have to be personalized whereby for example the secret cryptographic key of the software token gets a value that is associated with the user. In some embodiments the process to personalize the software token, more in particular the process to personalize the value of the secret cryptographic key of the software token, may use the value of a dynamic credential generated by a hardware token associated with the user.

Using a Hardware Dynamic Credential as Personalization Seed for the Secret Cryptographic Key of a Software Token In some embodiments the software token may be adapted to determine the value of the secret cryptographic key on the basis of a number of personalization data elements. In some embodiments the software token may be adapted to offer a personalization mode wherein the software token may request the user to provide the values of a number of these personalization data elements. In some embodiments the software token may be adapted to derive the value of the secret cryptographic key as a function of at least some of the personalization data elements. In some embodiments this derivation of the secret cryptographic key may comprise applying a cryptographic algorithm to at least some of the personalization data elements. In some embodiments the derivation of the secret cryptographic key may comprise applying a one-way hashing function to at least some of the personalization data elements. In some embodiments the derivation of the secret cryptographic key may comprise cryptographically combining at least some of the personalization data elements with for example a cryptographic master key which may be hardcoded in the software code of the software token. As used herein, the terminology hardcoded may refer to input or configuration data that is embedded directly into the source code of an application or other executable object instead of obtaining that data from external sources.

In some embodiments these personalization data elements may comprise a dynamic credential that may be generated by a hardware token, for example by a hardware token already associated with the user of the software token. In some embodiments the hardware token may comprise for example a hardware token of the DIGIPASS® line of hardware tokens as provided by Vasco Data Security International, Inc. having a worldwide headquarters in Chicago, Ill. In some embodiments the hardware tokens may comprise an unconnected smart card reader and a smart card received by said unconnected smart card reader wherein the unconnected smart card reader and the received smart card may cooperate to generate a dynamic credential. The terminology unconnected smart card reader may in this context refer to a smart card reader that, in contrast to ordinary connected smart card readers, is not connected to any host computing device (such as an access device that the user may use to access an application or a personal host computer running a software token that may need to be personalized) for receiving input data (such as a challenge or transaction data for generating a dynamic credential) from the host computing device and/or for transferring to the host computing a dynamic credential generated by the unconnected smart card reader; instead the unconnected smart card reader may receive input data by the user entering the input data using a user input interface (such as a keyboard) of the unconnected smart card reader, and a dynamic credential generated by the unconnected smart card reader may be transferred by the unconnected smart card reader using a user output interface (such as for example a display) to present the dynamic credential to the user who then may transfer the presented dynamic credential to the destination. In some embodiments the smart card may comprise a memory for storing a secret hardware token key and a data processing component for performing a cryptographic calculation using said secret hardware token key for generating a dynamic credential. In some embodiments the unconnected smart card reader may be generic in the sense that it doesn't contain any personalized data elements itself. In some embodiments the smart card may contain all personalized data elements that are used in the generation (by the combination of the unconnected smart card reader and the inserted smart card) of the dynamic credential. In some embodiments the hardware token may comprise an unconnected smart card reader that may be adapted to generate a dynamic credential with an EMV-CAP (Europay-Mastercard-VISA-Chip Authentication Programme) smart card application on a smart card inserted in the unconnected reader. In some embodiments the unconnected smart card reader may be compatible or compliant with the EMV-CAP specifications.

Transferring a personalization dynamic credential from a hardware token to a software token.

In some embodiments the dynamic credential generated by the user's hardware token may be manually transferred by the user from the hardware token to the software token that is to be personalized. For example in some embodiments the hardware token may generate a dynamic credential and present the generated hardware token to the user using a user output interface (such as a display) of the hardware token. The user may then subsequently manually provide the presented dynamic credential to the software token, e.g. by using a user input interface (such as a keyboard or a touch screen) of the personal computer device that the software token is running on. For example in some embodiments the hardware token may be adapted to present the dynamic credential as a string of characters (e.g. numerical or alphanumerical) characters on a display of the hardware token and the user may read this string of characters and may copy this string to the software token running on the personal computing device.

In some embodiments the software token may be adapted to support a personalization mode in which the software token is adapted to: request the user to provide to the software token a dynamic credential generated by the user's hardware token, to receive from the user such a dynamic credential generated by the user's hardware token, and to use that received dynamic credential to personalize itself e.g. by deriving from the received dynamic credential the values of one or more personalized data elements (for example a secret cryptographic key that the software token subsequently may use to generate dynamic credentials itself).

In some embodiments the hardware token and the software token may be adapted to transfer from the hardware token to the software token a digital personalization message comprising personalization data which may comprise a dynamic credential generated by the hardware token. The hardware token may be adapted to emit this digital personalization message and the software token may be adapted to receive this digital personalization message without the user having to manually copy the digital personalization message or a part of the digital personalization message. For example in some embodiments the hardware token may comprise a (first) wireless data communication interface and may be adapted to output the digital personalization message using this wireless data communication interface. The personal computing device may also comprise a (second) wireless communication interface and the software token may be adapted to receive a digital personalization message emitted by the hardware token. For example in some embodiments the hardware token may comprise a graphical display adapted to display two-dimensional images and the hardware token may be adapted to encode the digital personalization message in a personalization image and display that personalization image on the graphical display. The personal computing device running the software token may comprise a digital camera for capturing images and the software token may be adapted to use this digital camera to capture a personalization image displayed by the hardware token, to decode that personalization image to obtain the embedded personalization message and to use that personalization message to personalize the software token.

In some embodiments there is no distinction between on the one hand dynamic credentials generated by the hardware token for authentication purposes (e.g. OTPs for authenticating a user to a remote computer based application or electronic signatures to secure transaction submitted by a user to a remote computer based application), and on the other hand dynamic personalization credentials generated by the hardware token for the user to use in personalizing a software token. For example in some embodiments the user may use an ordinary dynamic authentication credential generated by the hardware token to use in personalizing a software token. In some embodiments the hardware token may generate a dynamic personalization credential using the same dynamic credential generation mechanism as for generating dynamic authentication credentials. In some embodiments the hardware token may generate a dynamic personalization credential using the same cryptographic algorithms, cryptographic keys and algorithmic parameters as for generating dynamic authentication credentials.

In some embodiments a dynamic personalization credential may be generated by the hardware token using the same dynamic credential generation mechanism as for generating dynamic authentication credentials but using different external inputs for the dynamic credential generation mechanism. For example in some embodiments a dynamic personalization credential may be generated by the hardware token using the same dynamic credential generation mechanism for generating a response to an external challenge for authentication purposes whereby however the challenge that is provided to the hardware token for generating the dynamic personalization credential has a value that is different than the challenge values for generating authentication responses. For example in some embodiments a challenge that is used for generating a dynamic personalization credential may have a different structure or may be longer than a challenge used for generating an authentication response. For example in some embodiments a dynamic personalization credential may be generated by the hardware token using the same dynamic credential generation mechanism for generating an electronic signature over transaction data for securing a transaction whereby however the data that are provided to the hardware token for generating the dynamic personalization credential have a value that is different than the transaction data values for generating electronic signatures. For example in some embodiments one of the transaction data elements being signed by the hardware token may comprise a transaction type and there may be a value for the transaction type data element that is reserved for generating a dynamic personalization credential.

In some embodiments the hardware token may be adapted to generate dynamic personalization credentials and dynamic authentication credentials in a different way. In some embodiments the hardware token may use different cryptographic algorithms and/or different cryptographic keys and/or different dynamic variables and/or different algorithm parameters for generating dynamic personalization credentials and dynamic authentication credentials. The choice of the values for the parameters of the algorithms the generation of dynamic credentials may reflect certain trade-offs between potentially conflicting requirements. Embodiments wherein the values of such parameters can be set differently for dynamic personalization credentials and dynamic authentication credentials allow making different (and more appropriate) trade-off choices for dynamic personalization credentials and dynamic authentication credentials. For example in the case of dynamic credentials, the choice of the length of the credential on the one hand may affect the security (i.e. the shorter the credential the lower the security) while it may at the same time also affect the user experience (i.e. the longer the credential the less convenient it is for the user to copy). In some embodiments the hardware token may be adapted to generate dynamic personalization credentials the length of which is different than the length of any dynamic authentication credential generated by the same hardware token. In some embodiments the hardware token may be adapted to generate dynamic personalization credentials with a length that is longer than the length of any dynamic authentication credential generated by the same hardware token. This way the security aspect may be given more weight with respect to the user convenience aspect in the case of a dynamic personalization credential than in the case of a dynamic authentication credential.

In some embodiments the hardware token may have at least an authentication mode and a personalization mode. The hardware token may be adapted to generate dynamic authentication credentials in the authentication mode and to generate dynamic personalization credentials in the personalization mode. In some embodiments the hardware token may be adapted to support a way for the user to explicitly choose whether the hardware token should work in personalization mode. For example the hardware token may offer the user a menu option to choose the mode (e.g. personalization mode or authentication mode) that the hardware token should be in. In some embodiments the hardware token may be adapted to receive digital messages and may extract from a received digital message a data element that indicates in which mode the hardware token should be in to process the other contents of the digital message. For example in some embodiments the hardware token may be adapted to receive a digital personalization message which may comprise a data element that indicates to the hardware token that the message is a personalization message and that the hardware token is supposed to use the contents of that personalization message to generate a dynamic personalization credential. The hardware token may then enter its personalization mode and use the contents of the received personalization message to generate a dynamic personalization credential (rather than a dynamic authentication credential).

Synchronizing client and server seeding.

In some embodiments the secret cryptographic key of the software token may be shared between the software token and an authentication server that may be adapted to verify dynamic credentials generated by the software token. In some embodiments the authentication server may be adapted to determine the value of the secret cryptographic key that the software token has been personalized with. In some embodiments the authentication server may store in a database the determined value for the secret cryptographic key or one or more data elements from which the authentication server may determine or reconstruct the value for the secret cryptographic key of the software token. In some embodiments the authentication server may store in a database an association between a data element identifying the user and one or more data elements that comprise the value of the secret cryptographic key of the user's software token or that allow the reconstruction or determination of the value of the secret cryptographic key of the user's software token. In some embodiments the authentication server may be adapted to obtain the values of all the personalization data elements that the software token uses to personalize the value of the secret cryptographic key and the authentication server may be adapted to determine the personalized value of the secret cryptographic key of the software token using these obtained personalization data element values. In some embodiments the authentication server may determine the personalized value of the secret cryptographic key of the software token using the same algorithms as the software token. In some embodiments the authentication server and the software token may use the same algorithms to determine the same personalized value for the secret cryptographic key of the software token. In some embodiments the authentication server may be adapted to obtain the value of a dynamic credential that may have been generated by a hardware token of the user and that the software token may have used to personalize the secret cryptographic key of the software token, and the authentication server may use the obtained dynamic credential value to determine or derive the personalized value of the secret cryptographic key of the software token. In some embodiments the authentication server may be adapted to subsequently use the personalized value of the software token's secret cryptographic key that it has thus determined or derived, to verify a dynamic credential generated by the software token.

In some embodiments the value of the dynamic credential generated by the hardware token may be provided by the user to the software token for personalizing the secret cryptographic key of the software token and the authentication server may obtain this value of the dynamic credential by the user also providing this value of the dynamic credential to the authentication server. In some embodiments the value of the dynamic credential generated by the hardware token and used by the software token for personalizing the secret cryptographic key of the software token may be generated by the hardware token as a response to a challenge. In some embodiments the challenge may have been generated by the server and provided to the hardware token. In some embodiments the challenge may be generated by another entity than the hardware token and the authentication server and may be provided to both the hardware token and the authentication server. For example in some embodiments the challenge may be generated by the software token.

In some embodiments the authentication server may be adapted to obtain the value of the dynamic credential generated by the hardware token by generating itself a copy of the dynamic credential value that the authentication server may assume has been generated by the hardware token. In some embodiments the hardware token may be adapted to generate a dynamic credential by combining a dynamic variable (such as for example the dynamic variables explained in more detail herein for the software token) with a secret hardware token key using a symmetric cryptographic algorithm (such as for example the symmetric cryptographic algorithms explained in more detail herein for the software token) that may be parameterized by the secret hardware token key whereby the hardware token may share the secret hardware token key with the authentication server. In some embodiments the authentication server may have access to a copy of the secret hardware token key of the hardware token and may be adapted to determine a server value of the dynamic variable used by the hardware token to generate the value of the dynamic credential and the authentication server may be further adapted to use the thus determined server value of the dynamic variable with the copy of the secret hardware token key to generate a server value for the dynamic credential that is supposedly generated by the hardware token, and the authentication server may be further adapted to use this server value of the dynamic credential to determine the value of the personalized secret cryptographic key of the software token. In some embodiments the authentication server may use the same algorithm for combining the server value of the dynamic variable with the copy of the secret hardware token key to generate a server value for the dynamic credential as the algorithm that is used by the hardware token to generate its value for the dynamic credential.

Determining the server value of the dynamic variable.

In some embodiments the dynamic variable used by the hardware token may be based on a challenge and the authentication server may determine the server value of the dynamic variable by obtaining the value of the challenge. In some embodiments it may be the authentication server that has originally generated the challenge and that challenge may then have been provided (e.g. by the user) to the hardware token and both the authentication server and the hardware token may both use the challenge value for generating the same value of the dynamic credential. In some embodiments some other entity (e.g. the software token) may generate the challenge and that challenge may be provided (e.g. by the user) to both the authentication server and the hardware token for generating the same value of the dynamic credential.

In some embodiments the authentication server may determine a set or a range of possible values for the dynamic variable that the hardware token may have used for generating the dynamic credential. For example in some embodiments the dynamic variable of the hardware token may be based on a time value (that may for example be provided by a clock comprised in the hardware token) and the authentication server may be adapted to determine a time window defining a range of possible time values that may have been used by the hardware token. In some embodiments this range of possible time values may comprise at least two different possible time values. For example in some embodiments the dynamic variable of the hardware token may be based on the value of an event related variable (such as for example the event related variable explained in more detail for the software token e.g. a counter) and the authentication server may be adapted to determine a set of allowed values for the event related variable e.g. starting from the last value of the event related variable that the authentication server may have determined as having been used by the hardware token. In some embodiments this set of allowed values may comprise at least two different allowed values. In some embodiments the authentication server may be adapted to obtain synchronisation information. In some embodiments the authentication server may be adapted to use that synchronisation information to select one or more values from a set or range of possible values for the dynamic variable used by the hardware token and the authentication server may be adapted to further use the one or more selected values in determining the value of the dynamic credential that was effectively generated by the hardware token or the value of the personalized secret cryptographic key of the software token. In some embodiments the authentication server may determine a set of candidate values for the personalized secret cryptographic secret of the software token by determining or deriving a candidate value for each value of a set or range of possible values for the dynamic variable. In some embodiments the set or range of possible values for the dynamic variable comprises at least two different values. In some embodiments the authentication server may be adapted to use the synchronisation information mentioned earlier to make a selection among the candidate values for the personalized secret cryptographic secret of the software token.

In some embodiments the synchronisation information may comprise one or more dynamic credentials that may be generated by the software token after the software token has been personalized with a value for the secret cryptographic key. In some embodiments the authentication server may have determined a set of candidate values for the personalized secret cryptographic secret of the software token and may receive one or more dynamic credentials generated by the personalized software token and may attempt to validate the received one or more dynamic credentials generated by the personalized software token using each of the candidate values for the personalized secret cryptographic secret in turn. Based on whether or not validation of one or more of the received dynamic credentials was successful using a particular candidate for the personalized secret cryptographic, the authentication server may select (or promote) or reject (or demote) that particular candidate value.

In some embodiments the software token may be adapted to generate a personalization confirmation message after the secret cryptographic secret has been personalized. In some embodiments this personalization confirmation message may be communicated to the authentication server (e.g. by the user). In some embodiments the authentication server may use the received personalization confirmation message in determining the value of the personalized secret cryptographic secret or in determining the value of a dynamic variable that was used by the hardware token for generating the dynamic credential that was used in turn by the software token for personalizing its secret cryptographic secret.

In some embodiments the personalization confirmation message may comprise synchronisation data. For example in some embodiments the dynamic credential generated by the hardware token may be based on a time value or an event related variable and the dynamic credential generated by the hardware token may comprise hardware token synchronisation data for giving a verifying server an indication on the time value or the value of the event related variable that has been used by the hardware token in generating that dynamic credential. For example in some embodiments the dynamic variable may be time based and the dynamic credential may comprise a certain number of the least significant bits (such as the last two digits) of the time value, or the dynamic variable may be based on a counter and the dynamic credential may comprise a certain number of the least significant bits (such as the last four bits) of the counter value. In some embodiments a hardware token may generate a credential comprising such hardware token synchronisation data and this credential may be provided to the software token for personalization of the software token. The software token may extract the hardware token synchronization data from that credential that it has received, use the credential to personalize itself, and generate a personalization message wherein the software token may include the extracted hardware token synchronisation data in the personalization confirmation message. The authentication server may be adapted to receive the personalization confirmation message and to extract these hardware token synchronisation data from the received personalization confirmation message and to use the hardware token synchronisation data in determining the value of the dynamic variable that was used by the hardware token to generate the dynamic credential that was used in turn by the software token to personalize its secret cryptographic key.

Enabling the Software Token at the Authentication Server

In some embodiments the authentication server may use the personalization confirmation message as a proof or indication that the personalization of the software token has been completed and may upon receipt and/or successful verification of the personalization confirmation message enable the usage of the personalized software token. In some embodiments the authentication server may not validate dynamic credentials generated by a software token that has not yet been enabled. In some embodiments the personalization confirmation message comprises a confirmation credential which the software token may generate using a cryptographic algorithm that may be parameterized with the personalized secret cryptographic key. In some embodiments the confirmation credential may for example comprise a dynamic credential that the software token generates using its personalized secret cryptographic key. In some embodiments the confirmation credential may for example comprise the first dynamic credential that the software token generates using its personalized secret cryptographic key. In some embodiments the confirmation credential may comprise a MAC (Message Authentication Code) or an electronic signature that the software token generates using its personalized secret cryptographic key. In some embodiments the authentication server may be adapted to verify a confirmation credential comprised in a personalization confirmation message. In some embodiments the authentication server may be adapted to verify a confirmation credential comprised in a personalization confirmation message using a server value of the personalized secret cryptographic key of the software token that is assumed to have generated the confirmation credential. In some embodiments the authentication server may have determined a set of candidate values for the personalized secret cryptographic secret of the software token and the authentication server may receive a personalization confirmation message comprising a confirmation credential generated by the personalized software token and the authentication server may attempt to validate the received confirmation credential generated by the personalized software token whereby the authentication server may use each of the candidate values for the personalized secret cryptographic secret in turn. Based on whether or not validation of the received confirmation credential was successful using a particular candidate for the personalized secret cryptographic, the authentication server may select (or promote) or reject (or demote) that particular candidate value. Based on whether or not validation of the received confirmation credential was successful using any of the candidates for the personalized secret cryptographic, the authentication server may enable the usage of the personalized software token by the user for authentication purposes. In some embodiments also other criteria (than the successful verification of a confirmation credential) may be used by the authentication server to decide whether or not to enable the usage of the software token.

Additional data for seeding the secret cryptographic key.

In some embodiments the entropy of a single dynamic credential generated by a hardware token may be deemed to be insufficient. For example in some embodiments a dynamic credential generated by the hardware token may consist of a string of 8 decimal digits and may offer an entropy of no more than 27 bits. In some embodiments the software token may be adapted to use also other data elements besides a dynamic credential of a hardware token to determine or derive the value of the secret cryptographic key, for example in order to increase the entropy of the resulting secret cryptographic key. For example in some embodiments the software token may be adapted to use multiple dynamic credential values generated by the hardware token thus potentially multiplying the entropy of the secret cryptographic key that may be derived from these multiple dynamic credential values.

In some embodiments the dynamic credential of the hardware token may be based on a challenge and the software token may also use that challenge in the derivation of the secret cryptographic key. For example in some embodiments the challenge may be provided by an authentication server (for example as a randomly generated value) to the user and the user may provide that challenge value to both the hardware token for the generation of the dynamic credential and to the software token (e.g. together with the value of the generated dynamic credential) for the personalization of the secret cryptographic key. In some embodiments the challenge may be generated by the software token (for example as a random or pseudo-random value) and may be provided by the software token to the user to be provided to the hardware token for generating the dynamic credential and may then also be provided (e.g. by the user) to the authentication server (for example as part of a personalization confirmation message) for the authentication server to also determine the value of the dynamic credential generated by the hardware token and the personalized secret cryptographic key derived by the software token.

In some embodiments other additional data may be used for deriving the secret cryptographic key from. For example in some embodiments data that is known to both the user and the authentication server may be used whereby these data may be provided to the software token by the user. Examples of such data may include for example user identifying data (such as a user name or a user id), or an account number, or application data specific for the user (for example the current balance on a bank account belonging to the user). In some embodiments such data commonly known by the user and the authentication server may comprise a secret shared between the authentication server and the user such as for example a password. In some embodiments such password may comprise a personalization password that is meant to be used only once, namely for the personalization of the software token. In such embodiments the personalization password may be generated by the authentication server and delivered to the user by means of a communication channel that may be deemed to be sufficiently secure such as for example a letter sent by registered mail. The software token may be adapted to request the user to provide this personalization password and to receive the personalization password from the user. The software token may then use the personalization password for personalizing itself. For example the software token may combine the personalization software with a dynamic credential generated by the hardware token (e.g. by concatenation) and the resulting combination may be used for personalizing the software token in the same way that the dynamic credential alone may be used in other embodiments.

In some embodiments the user experience, when the user is interacting with the hardware token to generate a dynamic credential that is to be used for personalizing a software token, may be different than the user experience when the user is interacting with the hardware token to generate an ordinary dynamic credential that is to be used for example to authenticate the user to a computer based application. For example, in some embodiments the hardware token may support a separate mode or a separate function for generating dynamic credentials that may be used in the personalization of software tokens. In some embodiments users can access such a separate mode or separate function for example by selecting a specific menu item or by pressing a specific button. In some embodiments a specific personalization transaction type must be selected or provided to the hardware token for the token to generate a valid dynamic credential that can be used for personalizing a software token. In some embodiments a dynamic credential that may be used for personalizing a software token may have different characteristics than an ordinary application dynamic credential. For example in some embodiments a dynamic credential that may be used for personalizing a software token may be considerably longer than a dynamic credential for signing a transaction or for authenticating a user. Such differences in user experience and/or characteristics of the dynamic credentials may reduce the risk that a user may be duped by a social engineering attack in generating a dynamic credential that may be used for personalizing a software token and handing over the generated dynamic credential to a fraudulent party that may use the stolen dynamic credential to illegitimately personalize a software token that may then be used to fraudulently impersonate the legitimate user to an application.

Using a hardware token to authenticate towards a provider of personalization data or personalized software tokens.

In some embodiments a user may use a dynamic credential generated by a hardware token to get access to a provider of personalization data. For example, in some embodiments a user may authenticate towards an authentication server using a dynamic credential generated by a hardware token associated with the user and upon successful authentication of the user the authentication server may generate and/or assign a personalization code to the user and communicate the personalization code to the user which may in turn provide the personalization code to a software token to personalize that software token. In some embodiments when downloading a software token application a user may be first authenticated on the basis of a dynamic credential generated by the user's hardware token. Upon successful authentication of the user the download server (which may for example comprise an application store) may generate and/or assign a software download package that may not only comprise the generic software token application program code but that may already be personalized by embedded personalization data such that upon installation of the downloaded package the software token is automatically personalized.

Coexistence of a soft token with a hardware token and other soft tokens.

In some embodiments hardware tokens and software tokens may be used fully equivalently. In some embodiments the use of software tokens is restricted in comparison to hardware tokens. For example in some embodiments a user may be granted access to certain functionality of a computer based application and/or may submit certain types of transactions when presenting a (valid) dynamic credential generated by a software token, but may only get access to certain other application functionality and/or may only submit certain other types of transactions upon presenting a (valid) dynamic credential that has been generated by a hardware token. For example in some embodiments a user may log in and perform low risk transactions (such as a transfer of a low amount of money to a previously used account) using his or her software token but must use his or her hardware token to perform high risk transactions (such as for example a transfer of a high amount of money to a new account that the user hasn't yet transferred money to before).

In some embodiments more than one differently personalized software tokens may be associated with the same user and may be used interchangeably. In some embodiments when a new software token instance is personalized and enabled for and associated with a certain user, any software token instance previously associated with that same user may be automatically disabled.

Some Advantages of Embodiments of the Invention

Using a dynamic credential generated by a hardware token that is already associated with a user to personalize a software token may provide a secure and user friendly way for personalizing a software token that a user may have downloaded and installed on a general purpose personal computing device that is under control of the user. Since the hardware token is already associated to the user and is already in the hands of the user, there may no longer be a need to send e.g. a letter to the user containing a personalization code that the user must provide to the software token to personalize the software token. This avoids the costs and delays usually associated with sending secure letters to users. This may also be more secure than sending a secure letter since there is no longer the risk of the secure letter being intercepted and/or copied in the mail by fraudsters. Alternatively, a dynamic credential generated by a hardware token may be in personalizing a software token to increase the security of other personalization methods such as methods based on a personalization password sent to the user to provide to the software token to be personalized.

BRIEF DESCRIPTION OF THE DRAWINGS

The foregoing and other features and advantages of the invention will be apparent from the following, more particular description of embodiments of the invention, as illustrated in the accompanying drawings.

DETAILED DESCRIPTION

Some implementations of the present invention are discussed below. While specific implementations are discussed, it should be understood that this is done for illustration purposes only. A person skilled in the relevant art will recognize that other components and configurations may be used without parting from the spirit and scope of the invention.

Figure 1:
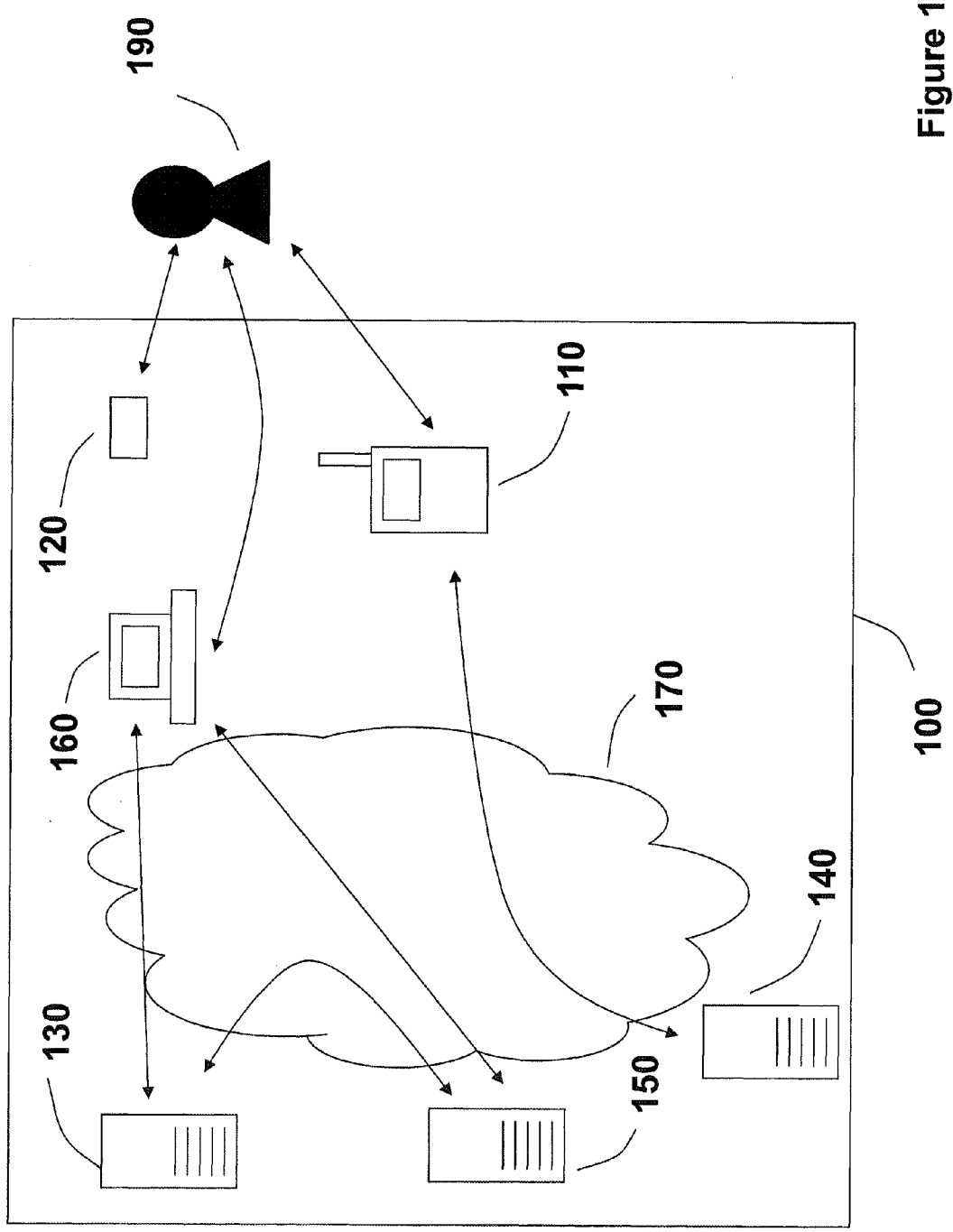
FIG. 1 schematically illustrates an exemplary system according to an aspect of the invention.

FIG. 1 schematically illustrates an exemplary system (100) of the invention according to an aspect of the invention.

In some embodiments the system may comprise one or more personal computing devices (110), one or more hardware tokens (120), and an authentication server (130). In some embodiments the system may further comprise an application store server (140). In some embodiments the system may further comprise an application server (150). In some embodiments the system may further comprise one or more access devices (160). In some embodiments the system may further comprise a computer network (170).

In some embodiments the personal computing device (110) may be associated with a particular user (190). In some embodiments the personal computing device may comprise a user input interface (such as a keyboard or a touch screen) for receiving inputs from a user and a user output interface (such as a display) for presenting outputs to a user. In some embodiments the personal computing device may comprise a memory component that may be adapted to store data and that may also be adapted to store executable program code. In some embodiments the personal computing device may comprise a data processing component that may be adapted to execute executable program code that may for example be stored in the memory component. In some embodiments the personal computing device may be running an operating system. In some embodiments the operating system may allow the user to install extra software applications or apps on the personal computing device for providing extra functionality to the personal computing device. Examples of personal computing devices may include smartphones and tablet computers.

In some embodiments one of the extra software applications ("apps") that may be installed on the personal computing device may comprise a software token. The software token may be adapted to function as has been described in more detail elsewhere in this description. More in particular the software token may be adapted to generate dynamic credentials by cryptographically combining a dynamic variable with a secret cryptographic key for example using a symmetric cryptographic algorithm that may be parameterized with the secret cryptographic key. The secret cryptographic key of the software token may be stored in the memory component of the personal computing device. In some embodiments the secret cryptographic key of a software token may be shared with an authentication server (130). In some embodiments each individual instance of a software token on a separate personal computing devices may have its own individual value for the secret cryptographic key that may be associated with a particular user and that may be different from the value for the secret cryptographic key of other instances of the software token. In some embodiments the software token may communicate a generated dynamic credential to a user using the user output interface of the personal computing device. In some embodiments the software token may be adapted to communicate a generated dynamic credential directly to a server, such as an authentication or application server, for further processing such as verifying or validating the generated dynamic credential. For example, in some embodiments the personal computing device may comprise a mobile phone and the software token may be adapted to send a generated dynamic credential via an SMS (Short Messaging Service) message to a server. Or, in some embodiments the personal computing device may have an internet connection and may send a generated dynamic credential over the internet to a server. In some embodiments the software token may receive input data (such as for example a challenge or transaction data) from the user via the user input interface. In some embodiments the software token may also receive input data using another input mechanism (e.g. using a camera to capture an image of for example a 2D-barcode encoded with the input data).

Installing and Personalizing the Software Token Using a Hardware Token

In some embodiments the personal computing device may be adapted to obtain the software token application software for example by downloading the software token application software from an application store server (140). In some embodiments personalizing the secret cryptographic key of the software token (i.e. ensuring that the secret cryptographic key of the software key gets a specific value that may be associated with a particular user) may involve the use of a dynamic credential generated by a hardware token (120) of the user. For example in some embodiments a user may download a fully personalized software token instance upon presentation of a valid dynamic credential generated by a hardware token of the user, whereby the downloaded software token instance may not only contain the generic software code of the software token but also personalized data elements including the value for the secret cryptographic key of the software token. In some embodiments the software token may be adapted to go, after installation, through a personalization phase during which the software token may receive personalization data elements that the software token may use to derive for example the personalized value of the secret cryptographic key of the software token. In some embodiments one or more of these personalization data elements may be provided by for example an authentication server (130). In some embodiments these one or more personalization data elements may be provided by for example an authentication server after presentation of a valid dynamic credential that has been generated by a hardware token of a user. In some embodiments the personalization data elements that the software token may use to derive for example the personalized value of the secret cryptographic key of the software token may comprise a dynamic credential that has been generated by a hardware token of a user, as is explained in more detail elsewhere in this description. More details on the personalization of a software token and on other aspects of the software token in certain embodiments can be found elsewhere in this description.

In some embodiments the hardware token (120) may comprise a hardware device that may be dedicated to the generation of dynamic credentials by cryptographically combining a dynamic variable with a secret hardware token key using a symmetric cryptographic algorithm parameterized with the secret hardware token key. The secret hardware token key may be securely stored in a memory component comprised in the hardware token. The secret hardware token key may be shared with an authentication server (130) and may be associated with the user (190). The hardware token may further comprise a data processing component that may be adapted to perform the cryptographically combining of the dynamic variable with the secret hardware token key. The hardware token may further also comprise a user input interface for receiving inputs from the user, such as for example a challenge or transaction data or a PIN (Personal Identification Number), and a user output interface for presenting outputs to the user, such as for example a dynamic credential generated by the hardware token. In some embodiments the hardware token may also receive input data using another input mechanism (e.g. using a camera to capture an image encoded with data such as for example a 2D-barcode or a QR-code). In some embodiments the hardware token may be adapted to generate specific dynamic credentials that are destined to be used in the personalization of a software token. In some embodiments the hardware token may comprise an unconnected smart card reader for receiving a smart card and may be adapted to generate the dynamic credential by the unconnected smart card reader cooperating with the inserted smart card. In some embodiments the unconnected smart card reader and the inserted smart card may be EMV-CAP compatible and/or compliant.

In some embodiments the hardware token is a compact, portable, handheld authentication device. In some embodiments the dimensions of the hardware token don't exceed 13 cm×7 cm×1 cm. In some embodiments the weight of the hardware token doesn't exceed 100 gr.

In some embodiments the authentication server (130) may be adapted to verify dynamic credentials generated by hardware tokens (120) and/or software tokens running on personal computing devices (110) of users (190). The authentication server may be adapted to share secret hardware token keys that are associated with users, with the hardware tokens of these users. The authentication server may also be adapted to share secret cryptographic keys that are associated with users, with the software tokens of these users that may be running on the personal computing devices of these users. In some embodiments the authentication server may comprise a database for storing server copies of these shared secret hardware token keys and/or secret cryptographic keys. In some embodiments the authentication server may comprise a data processing component for performing for example cryptographic calculations and algorithms for example to validate dynamic credentials generated by hardware tokens and/or software tokens running on personal computing devices. In some embodiments the authentication server may be adapted to verify the validity of a dynamic credential by generating a verification reference value and comparing the generated verification reference value with the dynamic credential. In some embodiments the authentication server may be adapted to generate the verification reference value by cryptographically combining a server value for a dynamic variable with a server value for a cryptographic secret key or secret hardware token key using a cryptographic algorithm that is parameterized with the server value of the cryptographic secret key or secret hardware token key. In some embodiments the cryptographic algorithm that the authentication server uses for generating the verification reference value may comprise a symmetric cryptographic algorithm. In some embodiments the cryptographic algorithm that the authentication server uses for generating the verification reference value may comprise a symmetric cryptographic algorithm that may be parameterized with a server copy of a shared secret hardware token key or secret cryptographic key. In some embodiments the cryptographic algorithm that the authentication server uses for generating the verification reference value may comprise a cryptographic algorithm that is the same or at least substantially the same as a cryptographic algorithm that has been used to generate the dynamic credential to be validated. More details about the generation of dynamic credentials by hardware tokens have been described elsewhere in this description.

In some embodiments the authentication server may be adapted to generate and/or make available personalization data that may be used in personalizing the value of a secret cryptographic key of a software token of a user. Such personalization data provided by an authentication server may comprise a challenge generated by the server. In some embodiments the authentication server may make the personalization data available upon successful verification of a dynamic credential that has been generated with a hardware token (120) associated with the user.

In some embodiments the authentication server may be adapted to determine the value of a secret cryptographic key of a software token of a user that has been personalized by the software token whereby the software token may have derived the secret cryptographic key value from (inter alia) a dynamic credential generated by a hardware token of the user. In some embodiments the authentication server may be adapted to determine the value of a dynamic credential that has been generated by a hardware token of the user and that has been used by a software token for deriving the personalized value of the secret cryptographic key of the software token. In some embodiments the authentication server may be adapted to use the determined value of the dynamic credential to derive the personalized value of the secret cryptographic key of the software token. In some embodiments the authentication server may be adapted to use a personalization confirmation message, that may have been generated by a software token upon personalization of the software token, in determining the personalized value of a secret cryptographic key of the software token. In some embodiments the authentication server may be adapted to use the personalization confirmation message in determining the value of the dynamic credential that has been generated by a hardware token of the user and used by the software token for deriving the personalized value of the secret cryptographic key of the software token. In some embodiments the authentication server may be adapted to extract synchronisation data from the personalization confirmation message and use these synchronisation data in determining the value of a dynamic credential that has been generated by a hardware token of the user and used by a software token for deriving the personalized value of the secret cryptographic key of the software token.

In some embodiments the authentication server may be adapted to enable the usage of a software token that has been personalized with a value for the secret cryptographic key of the software token. In some embodiments the authentication server may automatically enable the usage of the software token when the authentication server has determined the personalized value of the secret cryptographic key of the software token. In some embodiments the authentication server may enable the usage of the software token after having verified that the server value that it has determined for the secret cryptographic key of the software token is indeed the same value as the value that the software token has. In some embodiments the authentication server may extract a confirmation credential from the personalization confirmation message and cryptographically validate the extracted confirmation credential and the enablement of the usage of the software token may be dependent on the result of the cryptographic validation of the extracted confirmation credential. More details of the functioning and/or other aspects of an authentication server of some embodiments, especially with respect to the role of the authentication server in the personalization process of a software token have been described elsewhere in this description.

In some embodiments the authentication server may comprise one or more server computers. In some embodiments the one or more server computers comprised in the authentication server may be adapted to communicate with other computing devices such as an application server (150), an application store server (140), an access device (160) or a personal computing device (110). In some embodiments this communication may happen over a computer network (170).

In some embodiments the application store server (140) may be adapted to make available for download a set of applications to be downloaded and installed on personal computing devices (110). In some embodiments the set of applications may comprise a software token. In some embodiments the set of applications may comprise a client app for allowing the user to access and interact with the server part of a remotely accessible application. In some embodiments this server part of a remotely accessible application may be hosted by an application server (150). In some embodiments the software token may be comprised in such a client app. For example in some embodiments the remotely accessible application may comprise an internet or mobile banking application. In some embodiments the client app may comprise a mobile banking client app. In some embodiments the application store server may comprise one or more computer servers that may be accessible by for example personal computing devices over a computer network (170).

In some embodiments the application server (150) may be adapted to host a server part of a computer based application that may be accessed by a user, for example by using access device (160). In some embodiments the interaction of the user with the computer based application may be secured by the usage of dynamic credentials generated by a hardware token or a software token associated with the user. For example a user may have to present a valid OTP to log in or may have to present a valid electronic signature over the data of a transaction that the user requests the application to perform. In some embodiments the application server may delegate the verification of dynamic credentials to the authentication server (130). In some embodiments the authentication server may be comprised in the application server. In some embodiments the computer based application may be web based and the application server may comprise a web server.

In some embodiments the access device (160) may comprise a user input interface (e.g. a keyboard) and/or a user output interface (e.g. a display) for interacting with a user. In some embodiments the access device may comprise a data processing component. In some embodiments the access device may be adapted to run a client part of a computer based application. In some embodiments the access device may be adapted to allow a user to access a computer based application. In some embodiments the computer based application may be hosted on a remote computer, such as the application server (150), and the access device may be adapted to communicate with that remote computer, for example over computer network (170). In some embodiments the access device may for example comprise a Personal Computer (PC), or a laptop, or a tablet computer, or a smartphone. In some embodiments the access device may be the same as the personal computing device (110). In some embodiments the computer based application may comprise a web-based application and the access device may run a web browser for allowing the user to interact with this web-based application. In some embodiments the access device may for example comprise a smartphone or a tablet computer and the access device may comprise a client app that the user may use to access a remotely accessible application such as for example a mobile banking application.

In some embodiments the computer network (170) may be adapted to support data communication between computing devices such as personal computing devices (110), authentication servers (130), application store servers (140), application servers (150) and/or access devices (160). In some embodiments the computer network (170) may comprise for example the internet and/or wireless data communication networks and/or public mobile telephony networks.

In some embodiments the personal computing device (110) may comprise a camera for capturing images and the software token installed on the personal computing device may be adapted to use this camera to capture an image that is encoded with a digital message and to decode the captured image and extract the digital message and process the digital message. In some embodiments the digital message may comprise personalization data for the software token to determine or derive a value of a secret cryptographic key of the software token. In some embodiments the digital message may comprise a message type indicator which may indicate to the software token that the digital message comprises a personalization message which comprises personalization data and that the token should use this personalization data for determining or deriving a value of a secret cryptographic key of the software token. Upon decoding the image and extracting the personalization message the token may automatically go into a personalization mode and determine or derive a value of a secret cryptographic key using the personalization data comprised in the personalization message. The software token may store, permanently or for an indeterminate period of time, for example in a non-volatile memory of the personal computing device, this determined or derived secret cryptographic key for future use in generating dynamic credentials. In some embodiments the personalization data may comprise a dynamic credential generated by a hardware token. In some embodiments the personalization message may have been generated by the hardware token. In some embodiments the personalization message may have been encoded into a digital personalization image by the hardware token. In some embodiments the hardware token may comprise a graphical display and the hardware token may be adapted to display a digital personalization image encoded with a personalization message which comprises a dynamic personalization credential generated by a hardware token. In some embodiments the hardware token may generate the personalization message, and may display the digital personalization image encoding the personalization message, in reaction to an event that brings the hardware token into a personalization mode. In some embodiments this event may for example be the selection by the user of a particular menu option. In some embodiments this event may be the reception by the hardware token of a personalization initiating message. In some embodiments this personalization initiating message that is received by the hardware token may comprise a data element, such as for example a challenge, that may be used by the hardware token when generating a dynamic personalization credential in response to receiving the personalization initiating message.

For example in some embodiments the process of personalizing a software token may start with an authentication server generating a personalization initiating message and encoding that personalization initiating message into an image. This image may for example be made available to the user in a printed letter, in an email, or on the display of an access device (e.g. after the user has securely logged-in into a remote application, possibly after having used the hardware token for authenticating the user to the remote application). The hardware token may comprise a digital camera for capturing images and the user may use the hardware token to capture the image encoded with the personalization initiating message. Upon capturing this image the hardware token may decode the captured image and extract the personalization initiating message. Upon investigation of the received message the hardware token may identify it as a personalization initiating message. The hardware token may enter a personalization mode. The hardware token may generate a dynamic personalization credential. If present, the hardware token may extract a personalization challenge from the received personalization initiating message and use the extracted personalization challenge as an input data element for the algorithm that the hardware token uses to generate the dynamic personalization credential. The hardware token may generate a personalization message comprising the generated dynamic personalization credential. The hardware token may encode the generated personalization message into a personalization image and display this personalization image on its display. This personalization image displayed on the display of the hardware token may then be captured by the camera of the user's personal computing device and may then be used by the software token on the user's personal computing device for personalizing the software token as described elsewhere in this description.

In some embodiments the personalization initiating message may provide a secure channel to securely transfer personalization data from the authentication server to the hardware token. For example in some embodiments the personalization initiating message may comprise data the confidentiality of which may be cryptographically protected. In some embodiments the authenticity and the integrity of the personalization initiating message may be cryptographically verifiable by the hardware token. For example in some embodiments the personalization initiating message may comprise an encrypted section that may be decrypted by the hardware token. In some embodiments the server may have encrypted this section using a symmetric encryption algorithm (such as for example AES) parameterized with an encryption key that may be shared between the authentication server and the hardware token, and the hardware token may be adapted to decrypt this section using a complementary symmetric decryption algorithm parameterized with its copy of the shared encryption key. In some embodiments the authentication server may be adapted to generate a signature or MAC (Message Authentication Code) over a section of the personalization initiating message using a symmetric cryptographic signature algorithm parameterized with an authentication key that may be shared between the authentication server and the hardware token and to include the generated signature or MAC in the personalization initiating message, and the hardware token may be adapted to verify this signature or MAC using a complementary symmetric cryptographic parameterized with its copy of the authentication key. In some embodiments the symmetric cryptographic signature algorithm may be based on a symmetric encryption algorithm. In some embodiments the symmetric cryptographic signature algorithm may be based on a cryptographic hash function such as SHA-2 (Secure Hash Algorithm 2) or HMAC.

In some embodiments the authentication server may be adapted to generate a first personalization seed. In some embodiments the authentication server may generate the first personalization seed as a random number generated by a true random number generator or by a pseudo random number generator. In some embodiments the authentication server may generate an initial value and may generate the first personalization seed as a function of that initial value. In some embodiments the initial value may be generated by a true random number generator or by a pseudo random number generator. In some embodiments the initial value may be derived from a master key and a key diversification data element, such as a serial number for the software token. In some embodiments the authentication server may set the value of the first personalization seed to the value of the initial value. In some embodiments the authentication server may generate the first personalization seed by encrypting the initial value and setting the value of the first personalization seed to the encrypted initial value.

In some embodiments the first personalization seed may have an entropy of at least 64, or 96 or 128 bits. In some embodiments the first personalization seed may have a size of at least 64, or 96 or 128 bits.

The authentication server may encrypt the first personalization seed. The server may generate a signature or MAC over the first personalization seed. The server may generate a (first) personalization initiation message comprising the encrypted first personalization seed and the signature over the first personalization seed. In some embodiments the encrypted first personalization seed may be comprised in an encrypted section of the (first) personalization initiation message that may also comprise other data than the first personalization seed. In some embodiments the authentication server may generate the signature of MAC over data comprised in the (first) personalization initiation message that include the first personalization seed but also may include other data than the first personalization seed. In some embodiments the signature or MAC may be included in the data comprised in the encrypted section. In other embodiments the signature of MAC may be generated over data comprising the encrypted section.

In some embodiments the (first) personalization initiation message may be transferred from the authentication server to the hardware token and received by the hardware token as explained in more details elsewhere in this description. The (first) personalization initiation message may for example be encoded in a digital image (such as a 2D-barcode or a QR-code) that may be captured by a digital camera comprised in the hardware token whereupon the hardware token may decode the captured image to retrieve the (first) personalization initiation message.

In some embodiment the hardware token may verify the authenticity and/or integrity of a section of the received (first) personalization initiation message that comprises the first personalization seed. Any other actions of the hardware token involving the first personalization seed may be conditional on the success of this verification. In some embodiments the hardware token may decrypt a section of the received (first) personalization initiation message that comprises the first personalization seed and retrieve the first personalization seed.

In some embodiments the hardware token may then compute a second personalization seed from the first personalization seed. In some embodiments the hardware token may compute the second personalization seed from the first personalization seed in a way that is fully deterministic for the authentication server using only data that are unambiguously known to the authentication server. For example in some embodiments the second personalization seed may be identical to the first personalization seed. In some embodiments the hardware token may compute the second personalization seed from the first personalization seed by applying a transformation function to the first personalization seed. In some embodiments the transformation function may comprise a cryptographic function, such as a cryptographic hashing function. In some embodiments the cryptographic function may be parameterized with a first secret transformation key. In some embodiments the first secret transformation key may be unique for that hardware token with respect to the secret transformation keys of other hardware tokens. In some embodiments the first secret transformation key may be shared with the authentication server. In some embodiments the secret transformation key may have a size of 128 bits.

In some embodiments the second personalization seed may have an entropy of at least 64, or 96 or 128 bits. In some embodiments the second personalization seed may have a size of at least 64, or 96 or 128 bits.

In some embodiments the hardware token may generate a second personalization message comprising the second personalization seed. The second personalization message may then be transferred from the hardware token to a software token to be personalized and received by that software token as explained in more details elsewhere in this description. The hardware token may for example encode the second personalization message in a second digital image (such as a 2D-barcode or a QR-code) and may display this second digital image e.g. on a (graphical) display comprised in the hardware token. The software token may be adapted to capture the second digital image from the display of the hardware token (e.g. using a digital camera comprised in a general computing device running the software token) whereupon the software token may decode the captured image to retrieve the second personalization message.

The software token may be adapted to retrieve the second personalization seed from the second personalization message.

The software token may then derive a software token secret cryptographic key from the retrieved second personalization seed. The software token may be adapted to derive the software token secret cryptographic key from the retrieved second personalization seed. In some embodiments the software token may compute the software token secret cryptographic key from the second personalization seed in a way that is fully deterministic for the authentication server using only data that are unambiguously known to the authentication server. For example in some embodiments the software token secret cryptographic key may be identical to the second personalization seed. In some embodiments the hardware token may compute the software token secret cryptographic key from the second personalization seed by applying a software token transformation function to the second personalization seed. In some embodiments the software token transformation function may comprise a cryptographic function, such as a cryptographic hashing function. In some embodiments this cryptographic function may be parameterized with a second secret transformation key. In some embodiments the second secret transformation key may be the same for a set of software tokens. In some embodiments the second secret transformation key may be shared with the authentication server. In some embodiments the second secret transformation key may have a size of 128 bits. In some embodiments the software token may derive the software token secret cryptographic key from the second personalization seed using the same mechanisms as explained in more detail elsewhere in this description for a software token personalizing its secret cryptographic key using a dynamic credential that has been generated by a hardware token and that the software token has received from that hardware token.

The software token may store the derived software token secret cryptographic key in non-volatile memory for future use in for example subsequently generating dynamic credentials.

The software token may be adapted to generate a confirmation credential using the derived software token secret cryptographic key.

The authentication server may be adapted to determine the value of a server copy of the software token secret cryptographic key. In some embodiments the authentication token may be adapted to determine the same value of the second personalization seed as the hardware token. In some embodiments the authentication server may derive the same value for the software token secret cryptographic key as the software token.

In some embodiments the authentication server may compute its copy of the second personalization seed from the first personalization seed in the same way as the hardware token. In some embodiments the authentication server may compute its copy of the second personalization seed from the first personalization seed by applying the same transformation function to the first personalization seed as the hardware token. In some embodiments the transformation function may comprise a cryptographic function that may be parameterized with a first secret transformation key that may be shared between the hardware token and the authentication server, and the authentication server may retrieve the value of the first secret transformation key of the hardware token (e.g. from a database) and use that retrieved value to parameterize the transformation function when apply that transformation function to the first personalization seed to compute the second personalization seed.

In some embodiments the authentication server may derive its copy of the software token secret cryptographic key from the second personalization seed in the same way as the software token. In some embodiments the authentication server may compute its copy of the software token secret cryptographic key from the computed second personalization seed by applying a second transformation function to the computed second personalization seed. In some embodiments the second transformation function may be identical to the software token transformation function. In some embodiments the second transformation function may comprise a cryptographic function that may be parameterized with a second secret transformation key that may be shared between the authentication server and the software token, and the authentication server may retrieve the value of the second secret transformation key of the software token and use that retrieved value to parameterize the second transformation function when apply that second transformation function to the second personalization seed to derive its copy of the software token secret cryptographic key from the computed second personalization seed.

In some embodiments the authentication server may be adapted to receive a confirmation credential generated by the software token after that software token has been personalized. In some embodiments the authentication server may verify the received confirmation credential by using its copy of the software token secret cryptographic key. For example, in some embodiments the authentication server may use its copy of the software token secret cryptographic key to compute one or more expected reference values for the confirmation credential and the authentication server may compare the received confirmation credential with the one or more computed expected reference values and if the received confirmation credential matches one of these computed reference values then the authentication server may consider the verification of the received confirmation credential as successful.

In some embodiments the authentication server may store its copy of the software token secret cryptographic key (or equivalent data from which the copy of the software token secret cryptographic key can be reconstructed) in non-volatile memory for future use e.g. to subsequently verify dynamic credentials generated by the software token. In some embodiments the authentication server may enable usage of the personalized software token. In some embodiments storing its copy of the software token secret cryptographic key in non-volatile memory for future use and/or enabling the personalized software token may be conditional on the verification of the received confirmation credential having been done successfully.

Figure 2:
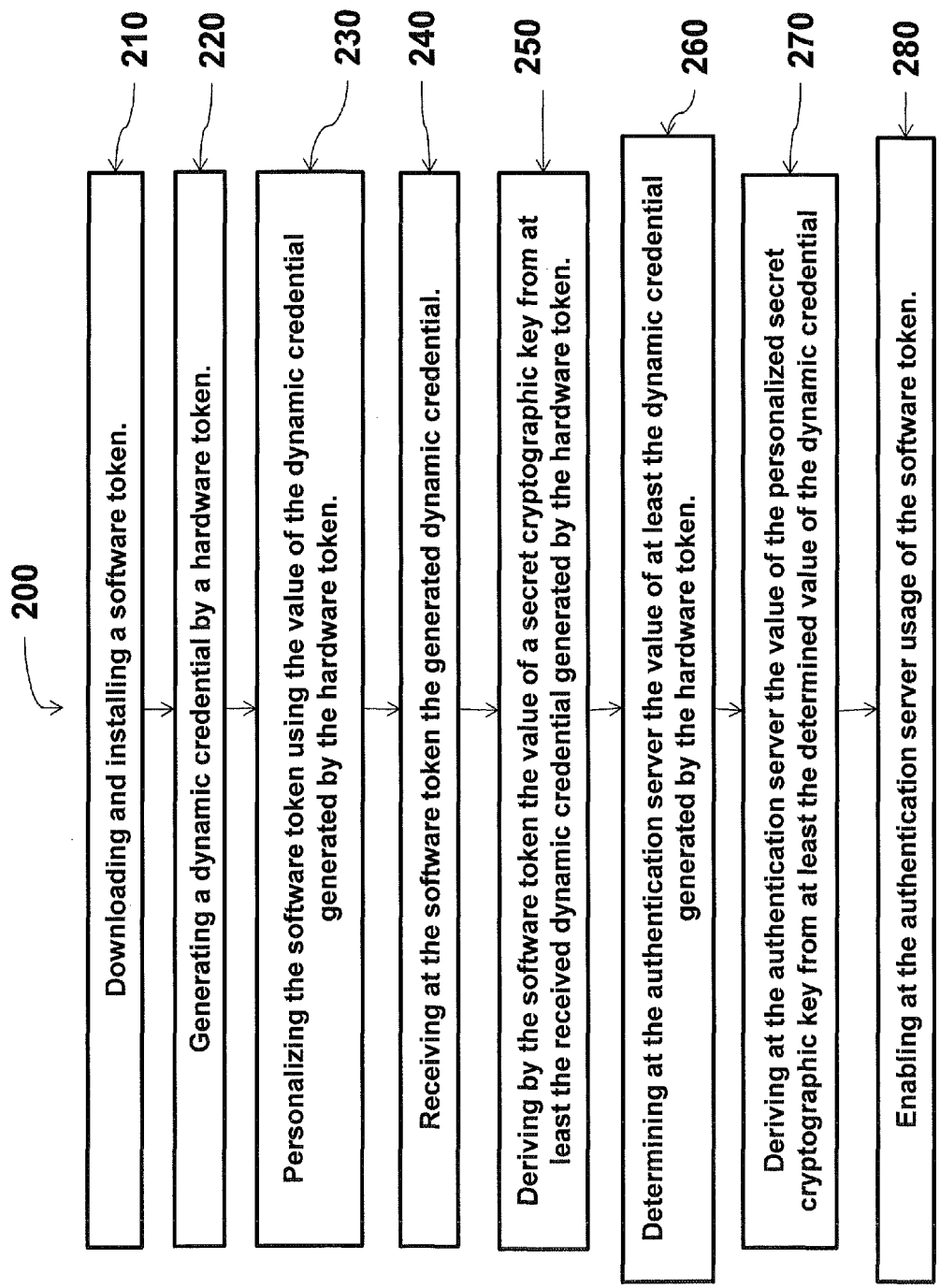
FIG. 2 schematically illustrates an exemplary method according to an aspect of the invention.

FIG. 2 schematically illustrates an exemplary method (200) of the invention according to an aspect of the invention. Variants of this method may be used with any of the systems described elsewhere in this description.

In some embodiments the method may comprise downloading (210), for example from an application store, and/or installing a software token on a personal computing device of a user.

In some embodiments the method may comprise generating (220) a dynamic credential by a hardware token associated with the user.

In some embodiments the method may comprise personalizing (230) the value of a secret cryptographic key of the software token using the dynamic credential generated by the hardware token.

In some embodiments the method may comprise submitting the dynamic credential generated by the hardware token to an authentication server and verifying at the authentication server the validity of the dynamic credential generated by the hardware token.

In some embodiments the method may comprise generating and/or making available at the authentication server one or more personalization server data elements. In some embodiments the one or more personalization server data elements may comprise a server challenge.

In some embodiments the method may comprise receiving by the software token at the personal computing device the values of one or more external personalization data elements.

In some embodiments the one or more external personalization data elements may comprise the dynamic credential generated by the hardware token and the method may comprise receiving (240) by the software token at the personal computing device the value of the generated dynamic credential.

In some embodiments the one or more external personalization data elements may comprise the one or more personalization server data elements and the method may comprise receiving (240) by the software token at the personal computing device the value of the one or more personalization server data elements.

In some embodiments the method may comprise the software token determining the value of one or more internal personalization data elements. In some embodiments the internal personalization data elements may comprise for example a time value that may be provided by for example a clock of the personal computing device. In some embodiments the internal personalization data elements may comprise a random or pseudo-random value that may be generated by the software token or that the software token may receive from the personal computing device. For example in some embodiments the random value may be generated by the software token from the measurements of time differences between certain user actions such as entering consecutive digits of a dynamic credential generated by the hardware token of the user.

In some embodiments the method may comprise obtaining by the software token the values of one or more personalization data elements. In some embodiments the obtained values of the one or more personalization data elements may comprise the values of the one or more external personalization data elements. In some embodiments the obtained values of the one or more personalization data elements may comprise the values of the one or more internal personalization data elements.

In some embodiments the method may comprise personalizing the software token. In some embodiments the method may comprise personalizing the value of a secret cryptographic key of the software token. In some embodiments personalizing the software token may comprise using the value of the dynamic credential generated by the hardware token.

In some embodiments the method may comprise deriving (250) by the software token from the one or more personalization data elements a secret cryptographic key. In some embodiments deriving the secret cryptographic key from the one or more personalization data elements may comprise the software token applying a cryptographic algorithm, such as a one-way hash algorithm, to the one or more personalization data elements. In some embodiments this cryptographic algorithm may be parameterized with a master secret that may be shared with an authentication server. In some embodiments this master secret may be shared by a plurality of more than one software token instances.

In some embodiments the software token may be adapted to store the value of the secret cryptographic key after the software token has determined or derived this value as part of the method for personalizing the software token. For example the software token may store this value in a memory of the personal computing device. In some embodiments the software token may permanently store the value of the secret cryptographic key. In some embodiments the software token, after it has been personalized, retrieves from memory the stored value of the secret cryptographic key whenever it needs to generate a dynamic credential. I.e., once personalized, the software token may be capable of generating dynamic credentials autonomously without the presence of a hardware token and without further requiring any dynamic personalization credential generated by a hardware token.

In some embodiments the method may comprise the software token generating and making available a personalization confirmation message. In some embodiments the personalization confirmation message may comprise synchronisation data related to the value of a dynamic variable that was used by the hardware token to generate the dynamic credential. In some embodiments the personalization confirmation message may comprise values related to the internal personalization data elements. In some embodiments the method may comprise the software token cryptographically generating a confirmation credential and including the confirmation credential in the personalization confirmation message. In some embodiments the software token may cryptographically generate the confirmation credential by using a cryptographic algorithm that may be parameterized with the software token's personalized secret cryptographic key. In some embodiments the confirmation credential may comprise a dynamic credential that the software token may have generated by cryptographically combining the value of a dynamic variable with the software token's personalized secret cryptographic key.

In some embodiments the method may comprise communicating the personalization confirmation message to the authentication server. In some embodiments the method may comprise receiving at the authentication server the personalization confirmation message.

In some embodiments the method may comprise determining at the authentication server the value of the secret cryptographic key that has been personalized at the software token. Upon determining this value, the authentication server may store this value, for example in a database linked to an identifier of the user, so that the authentication server may retrieve it later on for usage in the verification of validation of dynamic credentials generated by the software token.

In some embodiments determining at the authentication server the value of the secret cryptographic key that has been personalized at the software token may comprise obtaining at the authentication server the value of the personalization data elements that were used by the software token to derive the personalized value of the software token's secret cryptographic key, and deriving (270) at the authentication server the value of the personalized secret cryptographic key from the obtained values of the personalization data elements.

In some embodiments obtaining at the authentication server the value of the personalization data elements that were used by the software token to derive personalized value of the secret cryptographic key may comprise obtaining at the authentication server the value of at least some of the external personalization data elements that were used by the software token. In some embodiments obtaining at the authentication server the value of at least some of the external personalization data elements may comprise determining (260) at the authentication server the value of at least the dynamic credential generated by the hardware token that was used by the software token in personalizing the value of its secret cryptographic key. In some embodiments determining at the authentication server the value of the dynamic credential may comprise extracting from a received personalization confirmation message synchronization data and using the extracted synchronisation data to determine the value of a dynamic variable that may have been used by the hardware token to generate the dynamic credential.

In some embodiments obtaining at the authentication server the value of the personalization data elements that were used by the software token to derive its personalized value of the secret cryptographic key may comprise obtaining at the authentication server the value of at least some of the internal personalization data elements that were used by the software token. In some embodiments obtaining at the authentication server the value of at least some of the internal personalization data elements may comprise extracting from a received personalization confirmation message values related to the internal personalization data elements and using these extracted values to determine the value of the at least some of the internal personalization data elements.

In some embodiments the method may comprise the authentication server enabling (280) the usage of the software token. In some embodiments enabling the usage of the software token by the authentication server may be dependent on the authentication server successfully verifying that the value of the secret cryptographic key that the authentication server has determined corresponds to the value of the secret cryptographic key that the software token has personalized. In some embodiments this verification may comprise the authentication server extracting a confirmation credential from a received personalization confirmation message and verifying the validity of the extracted confirmation credential using a cryptographic algorithm that may be parameterized with the value of the secret cryptographic key that the authentication server has determined.

In some embodiments a first software token that may already have been personalized (by the same or another personalization method than the personalization methods described in this description) may replace the hardware token that generates a dynamic personalization credential for personalizing another second software token different from the first software token and still to be personalized. This first software token may be adapted to emulate the role of the hardware token. Such first software token, and the computing device running this second software token, may be adapted to perform any of the roles or functions and/or to comprise any of the features and components of any of the hardware tokens described elsewhere in this description.

In a variant of the invention, a first personalization initiation message may be generated by a server and received by a first token, where after the first token may generate a second personalization message which may be received by the second software token to be personalized according to the personalization methods described in more detail elsewhere in this description.

In some embodiments the first token may be a token that has already been personalized and that may be associated with the user. In some embodiments the first token may be a hardware token, whereas in other embodiments the first token may comprise a software token.

Figure 3:
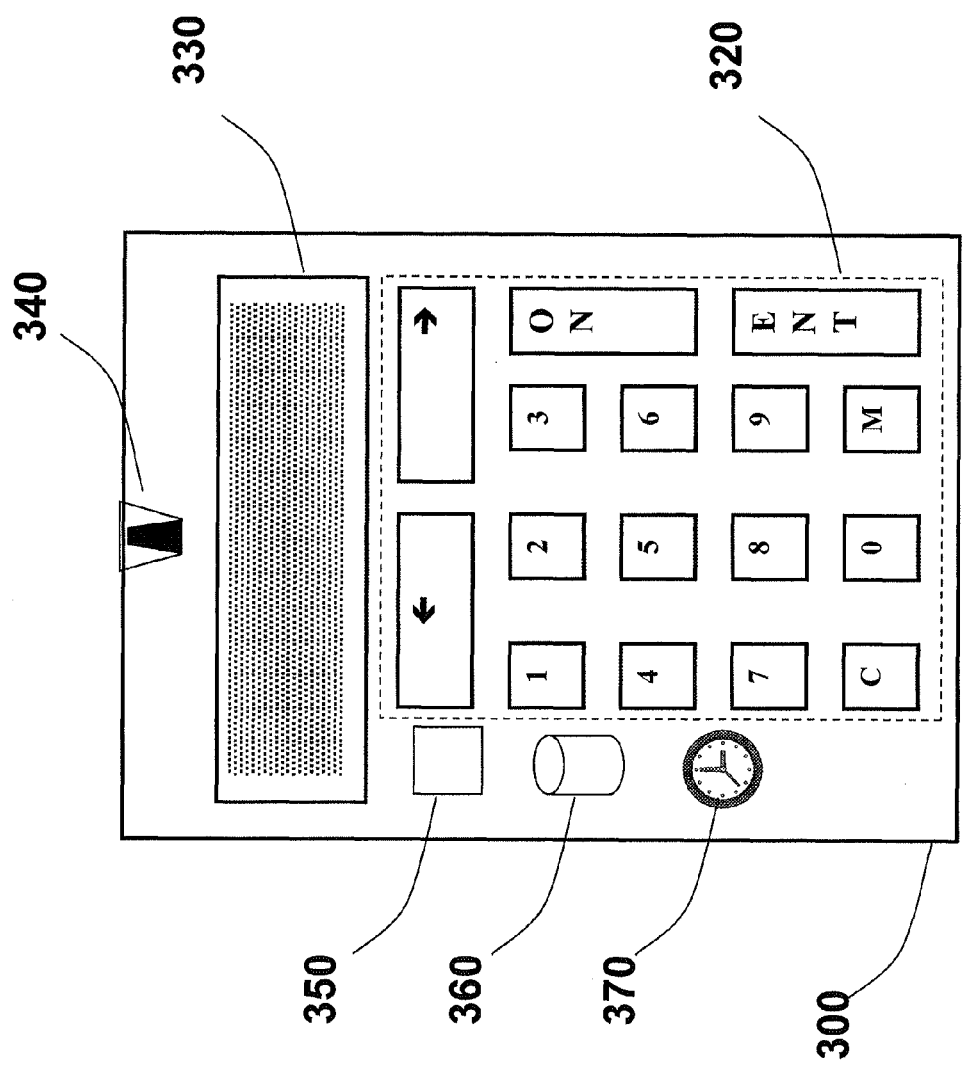
FIG. 3 schematically illustrates an exemplary apparatus according to an aspect of the invention.

FIG. 3 illustrates a personalization apparatus (300) according to an aspect of the invention.

In some embodiments the personalization apparatus may comprise: an input interface (340) comprising a digital camera, an output interface (330) comprising a graphical display, a memory (360) and a data processor (350) that may be connected to the input interface, the output interface and the memory; wherein the input interface may be adapted to receive a first personalization initiating message by capturing with said digital camera a first 2D-barcode image encoded with said first personalization initiating message; wherein the data processor may be adapted to decode said captured first 2D-barcode image to obtain said first personalization initiating message, to retrieve a first personalization seed from the received first personalization initiating message, to generate a second personalization seed from said retrieved first personalization seed, to generate a second personalization message comprising said generated second personalization seed, and to encode a second 2D-barcode image with said second personalization message; wherein the output interface may be adapted to output said second personalization message by displaying said second 2D-barcode image on said graphical display; and wherein said memory may be adapted to store a secret token key which is associated with a specific user that may be used by said data processor for said retrieving of the first personalization seed from the received first personalization initiating message, or for said generating of the second personalization seed from said retrieved first personalization seed.

In some embodiments the data processor (350) may comprise a digital data processing component. In some embodiments the data processor may comprise an IC (Integrated Circuit), such as a microprocessor, a microcontroller, or an FPGA (Field Programmable Gate Array).

In some embodiments the memory (360) may comprise RAM (Random Access Memory). In some embodiments the memory may comprise non-volatile memory such as ROM (Read Only Memory). In some embodiments the memory may comprise writable non-volatile memory such as EEPROM (Electrically Erasable Programmable Read Only Memory) or Flash or a hard-disk.

In some embodiments the personalization apparatus may furthermore comprise a human input interface (320) for obtaining inputs from user of the apparatus. The human input interface may for example comprise a keyboard or a touch screen.

In some embodiments the personalization apparatus may furthermore comprise a component (370) adapted to provide the value of a dynamic variable. For example the component may comprise a real-time clock.

In some embodiments the data processor may be further adapted to generate dynamic credentials by cryptographically combining a value of a dynamic variable, which may be provided by component (370), with a secret cryptographic key, which may for example be stored in memory (360).

One aspect of the invention provides a first software token personalization method.

In a first set of embodiments of the first method, the method may comprise the steps of: at a first authentication token generating a first dynamic credential by cryptographically combining a value of a first dynamic variable with a first credential generation key that is shared between the first authentication token and an authentication server, wherein said first credential generation key is associated with a specific user; receiving at a second software authentication token that is different from the first authentication token, the generated first dynamic credential; deriving at the second software authentication token a value for a second credential generation key from the received first dynamic credential; generating at the second software authentication token a confirmation credential using a cryptographic algorithm parameterized with the derived second credential generation key; receiving at the authentication server the confirmation credential; determining at the authentication server a server copy of the second credential generation key; validating at the authentication server the received confirmation credential using the server copy of the second credential generation key; if said validation of the confirmation credential at the authentication server is successful, associating at the authentication server the determined server copy of the second credential generation key with the specific user, and storing at the authentication server in non-volatile memory the determined server copy of the second credential generation key associated with the specific user. More details on the various steps of this method can be found elsewhere in this description. In some embodiments the determined value itself of the server copy of the second credential generation key may be stored; in other embodiments, equivalent data allowing the reconstruction of the determined value of the server copy of the second credential generation key may be stored. In some embodiments the second software authentication token may comprise a software authentication application running on a general purpose computing device, such as a smartphone or a tablet computer, wherein the second software authentication token is adapted to generate dynamic credentials by cryptographically combining a second dynamic variable with the derived second credential generation key. In some embodiments the step of validating at the authentication server the received confirmation credential using the server copy of the second credential generation key may comprise applying a cryptographic validation algorithm to the received confirmation credential wherein said cryptographic validation algorithm is parameterized by said server copy of the second credential generation key.

In some embodiments the method may comprise any method of the first set of embodiments further comprising the steps of: generating at the second software token a second dynamic credential by combining a second dynamic variable with the derived value of the second credential generation key; receiving at the authentication server the second dynamic credential; retrieving at the authentication server the stored server copy of the second credential generation key; verifying at the authentication server the received second dynamic credential using the retrieved server copy of the second credential generation key; generating at the authentication server an authentication signal if said verification of the received second dynamic credential is successful.

In some embodiments the method may comprise any of the methods of any of the previous embodiments further comprising the steps of: using at the authentication server the received confirmation credential for said determining a server copy of the second credential generation key. In some embodiments the method may further comprise the steps of: determining at the authentication server a set of possible values for the first dynamic variable; generating at the authentication server for each of the determined possible values of the first dynamic variable a reference value for the first dynamic credential using the first credential generation key; deriving for each of the generated first dynamic credential reference values a candidate value for the second credential generation key; searching at the authentication server among the generated candidate values for the second credential generation key a candidate value with which the received confirmation credential can be validated successfully; if a candidate value has been found with which the received confirmation credential can be validated successfully, determining at the authentication server the server copy of the second credential generation key as a candidate value with which the received confirmation credential has been validated successfully. In some embodiments the first dynamic credential generated by the first authentication token and received by the second software authentication token, may comprise synchronisation data comprising information about the value of the first dynamic variable used in the generation by the first authentication token of the first dynamic credential; and the step of generating the confirmation credential may comprise extracting at the second software authentication token the synchronisation data comprised in the received first dynamic credential and including the extracted synchronisation data in the confirmation credential; and determining at the authentication server a set of possible values for the first dynamic variable may comprise extracting at the authentication server the synchronisation data included in the received confirmation credential and using the extracted synchronisation data in selecting values for the set of possible values for the first dynamic variable.

Another aspect of the invention provides a first software token personalization system.

In some embodiments of the first system, the system may comprise a first authentication token, a second software authentication token that is different from the first authentication token and an authentication server; wherein the first authentication token may be adapted to generate a first dynamic credential by cryptographically combining a first dynamic variable with a first credential generation key that is shared between the first authentication token and the authentication server, wherein said first credential generation key is associated with a specific user; and wherein the second software authentication token may be adapted to receive the generated first dynamic credential, to derive a value for a second credential generation key using the received first dynamic credential, and to generate a confirmation credential using a cryptographic algorithm parameterized with the derived second credential generation key; and wherein the authentication server may be adapted to receive the confirmation credential, determine a server copy of the second credential generation key, verify the received confirmation credential using the server copy of the second credential generation key; if said verification of the confirmation credential is successful, to associate the determined server copy of the second credential generation key with the specific user, and store in non-volatile memory the determined server copy of the second credential generation key associated with the specific user. In some embodiments the second software authentication token may comprise a software authentication application running on a general purpose computing device, such as a smartphone or a tablet computer, wherein the second software authentication token is adapted to generate dynamic credentials by cryptographically combining a second dynamic variable with the derived second credential generation key.

One aspect of the invention provides a second software token personalization method.

In a first set of embodiments of the second method, the personalization method may comprise the steps of: generating, at an authentication server, a first personalization seed; generating, at the authentication server, a first personalization initiating message comprising said first personalization seed; receiving, at a first authentication token associated with a specific user, said first personalization initiating message; retrieving, at the first authentication token, said first personalization seed from the received first personalization initiating message; generating, at the first authentication token, a second personalization seed from said retrieved first personalization seed; generating, at the first authentication token, a second personalization message comprising said generated second personalization seed; receiving, at a second software authentication token that is different from the first authentication token, said second personalization message; retrieving, at the second software authentication token said second initialization seed from the received second personalization message; deriving, at the second software authentication token, a value for a credential generation key from the retrieved second personalization seed; generating, at the second software authentication token, a confirmation credential using a cryptographic algorithm parameterized with the derived value of the credential generation key; receiving, at the authentication server, the confirmation credential; determining, at the authentication server, a server copy of the credential generation key; validating at the authentication server the received confirmation credential using the server copy of the credential generation key. In some embodiments the second software authentication token may comprise a software authentication application running on a general purpose computing device, such as a smartphone or a tablet computer, wherein the second software authentication token is adapted to generate dynamic credentials by cryptographically combining a dynamic variable with the derived credential generation key. In some embodiments the first authentication token may comprise a secret token key which is associated with the specific user and said secret token key may be used in the step of retrieving, at the first authentication token, said first personalization seed from the received first personalization initiating message, or said secret token key may be used in the step of generating, at the first authentication token, a second personalization seed from said retrieved first personalization seed. More details about the various steps of the second software personalization method can be found elsewhere in this description.

In some embodiments the method may comprise any method of the first set of embodiments further comprising the steps of: if said validating of the confirmation credential at the authentication server is successful, associating at the authentication server the determined server copy of the credential generation key with the specific user, and storing at the authentication server in non-volatile memory the determined server copy of the credential generation key associated with the specific user. In some embodiments the determined value itself of the server copy of the credential generation key may be stored; in other embodiments, equivalent data allowing the reconstruction of the determined value of the server copy of the credential generation key may be stored.

In some embodiments the method may comprise any method of the previous embodiments further comprising the steps of: at the second authentication token, storing in non-volatile memory the derived value of the credential generation key or reconstruction data for allowing the second authentication token to reconstruct the derived value of the credential generation key. In some embodiments the reconstruction data may comprise the second initialization seed.

In some embodiments the method may comprise any method of the previous embodiments further comprising the steps of: retrieving at the second software authentication token the derived value of the credential generation key; generating at the second software authentication token a dynamic credential by combining a dynamic variable with the retrieved value of the credential generation key; receiving at the authentication server the dynamic credential; retrieving at the authentication server the server copy of the credential generation key; verifying at the authentication server the received dynamic credential using the retrieved server copy of the credential generation key. In some embodiments retrieving at the second software authentication token the derived value of the credential generation key may comprise the second software authentication token reading the derived value of the credential generation key from non-volatile memory. In some embodiments retrieving at the second software authentication token the derived value of the credential generation key may comprise the second software authentication token reconstructing the derived value of the credential generation key from reconstruction data read from non-volatile memory.

In some embodiments the method may comprise any method of the previous embodiments further comprising the steps of: generating, at the authentication server, an electronic signature over at least the first initialization seed and including said electronic signature in the first personalization initiation message; retrieving, at the first authentication token, said electronic signature, and verifying, at the first authentication token, the retrieved electronic signature. In some embodiments the method may further comprise the step of rejecting the first personalization initiation message if said verifying of the retrieved electronic signature is unsuccessful. In some embodiments generating the electronic signature may be done by using a cryptographic electronic signature generation algorithm parameterized with a cryptographic message authentication key. In some embodiments the cryptographic message authentication key may be shared between the authentication server and the first authentication token, and verifying the retrieved electronic signature may be done by using a cryptographic electronic signature verification algorithm parameterized with said cryptographic message authentication key. In some embodiments the electronic signature may comprise a MAC (Message Authentication Code).

In some embodiments the method may comprise any method of the previous embodiments further comprising the steps of: at the authentication server, encrypting the first personalization seed using a first encryption key that is associated with and unique for the authentication token, and including the encrypted first personalization seed in the first personalization initiation message; at the first authentication token, retrieving the encrypted first personalization seed from the first personalization initiation message, and decrypting the retrieved encrypted first personalization seed. In some embodiments the first encryption key may be shared between the authentication server and the first authentication token, and encrypting the first personalization seed using the first encryption key may comprise encrypting the first personalization seed using a symmetric encryption algorithm parameterized with (a server copy of) the first encryption key, and decrypting the retrieved encrypted first personalization seed may comprise decrypting the retrieved encrypted first personalization seed using a symmetric decryption algorithm parameterized with (a first authentication token copy of) the first encryption key.

In some embodiments the method may further comprise generating, at the authentication server, an initial value; wherein the step of determining, at the authentication server, a server copy of the credential generation key may comprise deriving, at the authentication server, the value of the server copy of the credential generation key from said initial value by using a key derivation method; and wherein the step of deriving, at the second software authentication token, a value for a credential generation key from the retrieved second personalization seed may comprise retrieving, at the second software authentication token, said initial value from the retrieved second personalization seed and deriving, at the second software authentication token, the credential generation key from said retrieved initial value by using said key derivation method. In some embodiments the key derivation method for deriving the credential generation key from the initial value may comprise setting the value of the credential generation key to the initial value.

In some embodiments the step of generating, at an authentication server, a first personalization seed may comprise encrypting, at the authentication server, said initial value using a second encryption key and setting the value of said first personalization seed to said encrypted initial value; and the step of deriving, at the second software authentication token, a value for a credential generation key from the retrieved second personalization seed may comprise retrieving from said second personalization seed said first personalization seed, decrypting said retrieved first personalization seed with a second decryption key that matches said second encryption key to obtain said initial value, in some embodiments the second encryption key may be shared between the authentication server and the second software authentication token, and encrypting the initial value using the second encryption key may comprise encrypting the initial value using a symmetric encryption algorithm parameterized with (a server copy of) the second encryption key, and decrypting the retrieved first personalization seed may comprise decrypting the retrieved first personalization seed using a symmetric decryption algorithm parameterized with (a first authentication token copy of) the second encryption key.

In other embodiments the step of generating, at an authentication server, a first personalization seed may comprise setting the first personalization seed to said initial value.

In some embodiments the step of deriving, at the second software authentication token, a value for a credential generation key from the retrieved second personalization seed may comprise retrieving, at the second software authentication token, the first personalization seed from the retrieved second personalization seed and deriving, at the second software authentication token, the credential generation key from the retrieved first personalization seed.

In some embodiments the step of generating, at the first authentication token, a second personalization seed from said retrieved first personalization seed may comprise setting the value of the second personalization seed to the value of the retrieved first personalization seed; and the step of deriving, at the second software authentication token, a value for a credential generation key from the retrieved second personalization seed may comprise retrieving, at the second software authentication token, the first personalization seed from the retrieved second personalization seed by taking the value of the retrieved second personalization seed and deriving the credential generation key from the retrieved first personalization seed. In some embodiments the step of deriving, at the second software authentication token, a value for a credential generation key from the retrieved second personalization seed may comprise setting the value of the credential generation key to the value of the retrieved second personalization seed.

In other embodiments the step of generating, at the first authentication token, a second personalization seed from said retrieved first personalization seed may comprise calculating the value of the second personalization seed as a first reversible transformation function of the retrieved first personalization seed; and the step of deriving, at the second software authentication token, a value for a credential generation key from the retrieved second personalization seed may comprise retrieving, at the second software authentication token, the first personalization seed from the retrieved second personalization seed by applying, at the second software authentication token, a second transformation function of the value of the retrieved second personalization seed, wherein the second transformation function is the reverse function of the first reversible transformation function, and deriving, at the second software authentication token, the credential generation key from the retrieved first personalization seed. For example, in some embodiments the first reversible transformation function may comprise a cryptographic encryption algorithm parameterized with a first cryptographic transformation key and the second transformation function may comprise a cryptographic decryption algorithm that matches said cryptographic encryption algorithm and that is parameterized with a second cryptographic transformation key that in turn matches said first cryptographic transformation key. For example, in some embodiments said cryptographic encryption algorithm may comprise a symmetric encryption algorithm (such as AES) and said cryptographic encryption algorithm may comprise a corresponding symmetric decryption algorithm, and the first cryptographic transformation key and the second cryptographic transformation key may be copies of a same symmetric cryptographic encryption-decryption key shared by the first authentication token and the second software authentication token. In some embodiments deriving, at the second software authentication token, the credential generation key from the retrieved first personalization seed may comprise setting, at the second software authentication token, the value of the credential generation key to the retrieved first personalization seed.

In some embodiments the method may comprise any method of the previous embodiments wherein the step of generating a second personalization seed from said retrieved first personalization seed may comprise calculating the value of the second personalization seed as the outcome of a first transformation function applied, at the first authentication token, to the value of the retrieved first personalization seed. In some embodiments the step of determining at the authentication server a server copy of the credential generation key may comprise calculating, at the authentication server, the value of a server copy of the second personalization seed as the outcome of the same first transformation function applied, at the authentication server, to the value of the first personalization seed, and determining the server copy of the credential generation key as a function of the value of the server copy of the second personalization seed. In some embodiments the first transformation function may be such that the value of the second personalization seed is different than the value of the first personalization seed. In some embodiments the first transformation function may comprise a cryptographic function, such as for example a cryptographic hash function. In some embodiments the first transformation function may comprise a symmetric cryptographic function, such as for example a keyed hash function or a symmetric encryption/decryption function, parameterized with a first secret symmetric cryptographic transformation key. In some embodiments the first secret symmetric cryptographic transformation key may be shared between the authentication server and the first authentication token. In some embodiments the first secret symmetric cryptographic transformation key may be unique for the given first authentication token. In some embodiments the first secret symmetric cryptographic transformation key may be shared between the first authentication token and the second software authentication token.

In some embodiments the method may comprise any method of the previous embodiments wherein the step of generating a second personalization seed from said retrieved first personalization seed may comprise setting the value of the second personalization seed to the value of the retrieved first personalization seed.

In some embodiments the method may comprise any method of the previous embodiments wherein the step of deriving, at the second software authentication token, a value for a credential generation key from the retrieved second personalization seed may comprise calculating the value of the credential generation key as the outcome of a second transformation function applied, at the second software authentication token, to the value of the retrieved second personalization seed. In some embodiments the step of determining at the authentication server a server copy of the credential generation key may comprise calculating, at the authentication server, the value of the server copy of the credential generation key as the outcome of the same second transformation function applied, at the authentication server, to the value of a server copy of the second personalization seed. In some embodiments the second transformation function may be such that the value of the credential generation key is different than the value of the second personalization seed. In some embodiments the second transformation function may comprise a cryptographic function, such as for example a cryptographic hash function. In some embodiments the second transformation function may comprise a symmetric cryptographic function, such as for example a keyed hash function or a symmetric encryption/decryption function, parameterized with a second secret symmetric cryptographic transformation key. In some embodiments the second secret symmetric cryptographic transformation key may be shared between the authentication server and the second software authentication token. In some embodiments the second secret symmetric cryptographic transformation key may be shared between the first authentication token and the second software authentication token. In some embodiments the second secret symmetric cryptographic transformation key may have the same value for a batch of authentication tokens that comprises the second software authentication token. In some embodiments the second secret symmetric cryptographic transformation key may be the same as the first secret symmetric cryptographic transformation key.

In some embodiments the method may comprise any method of the previous embodiments wherein the step of deriving, at the second software authentication token, a value for a credential generation key from the retrieved second personalization seed may comprise setting, at the second software authentication token, the value of the credential generation key to the value of the retrieved second personalization seed.

Another aspect of the invention provides a second software token personalization system.

In some embodiments of the second system, the personalization system may comprise: an authentication server, a first authentication token associated with a specific user, and a second software authentication token that is different from the first authentication token; wherein the authentication server may be adapted to generate a first personalization seed, and to generate a first personalization initiating message comprising said first personalization seed; wherein the first authentication token may be adapted to receive said first personalization initiating message, to retrieve said first personalization seed from the received first personalization initiating message, to generate a second personalization seed from said retrieved first personalization seed, and to generate a second personalization message comprising said generated second personalization seed; and wherein the second software authentication token may be adapted to receive said second personalization message, to retrieve said second initialization seed from the received second personalization message, to derive a value for a credential generation key from the retrieved second personalization seed, and to generate a confirmation credential using a cryptographic algorithm parameterized with the derived value of the credential generation key; wherein the authentication server may be further adapted to receive the confirmation credential, to determine a server copy of the credential generation key, and to validate the received confirmation credential using the server copy of the credential generation key. In some embodiments the second software authentication token may comprise a software authentication application running on a general purpose computing device, such as a smartphone or a tablet computer, wherein the second software authentication token is adapted to generate dynamic credentials by cryptographically combining a dynamic variable with the derived credential generation key. More details about the various components of the second software personalization system can be found elsewhere in this description.

Another aspect of the invention provides a personalization apparatus.

In some embodiments the personalization apparatus may comprise: an input interface comprising a digital camera, an output interface comprising a graphical display, a memory and a data processor that may be connected to the input interface, the output interface and the memory; wherein the input interface may be adapted to receive a first personalization initiating message by capturing with said digital camera a first 2D-barcode image encoded with said first personalization initiating message; wherein the data processor may be adapted to decode said captured first 2D-barcode image to obtain said first personalization initiating message, to retrieve a first personalization seed from the received first personalization initiating message, to generate a second personalization seed from said retrieved first personalization seed, to generate a second personalization message comprising said generated second personalization seed, and to encode a second 2D-barcode image with said second personalization message; wherein the output interface may be adapted to output said second personalization message by displaying said second 2D-barcode image on said graphical display; and wherein said memory may be adapted to store a secret token key which is associated with a specific user that may be used by said data processor for said retrieving of the first personalization seed from the received first personalization initiating message, or for said generating of the second personalization seed from said retrieved first personalization seed. A number of implementations have been described. Nevertheless, it will be understood that various modifications may be made. For example, elements of one or more implementations may be combined, deleted, modified, or supplemented to form further implementations. Accordingly, other implementations are within the scope of the appended claims. In addition, while a particular feature may have been disclosed with respect to only one of several implementations, such feature may be combined with one or more other features of the other implementations as may be desired and advantageous for any given or particular application. With respect to embodiments of the methods, while the various steps have been described in a particular order, it will be apparent for a person skilled in the art that the order of at least some of these steps may be altered. It will also be apparent for a person skilled in the art that some steps may be optional and other steps may be added. While various embodiments have been described above, it should be understood that they have been presented by way of example only, and not limitation. In particular, it is, of course, not possible to describe every conceivable combination of components or methodologies for purposes of describing the claimed subject matter, but one of ordinary skill in the art may recognize that many further combinations and permutations are possible. Thus, the breadth and scope of the teachings herein should not be limited by any of the above described exemplary embodiments but should be defined only in accordance with the following claims and their equivalents.

The invention claimed is:

1. A software token personalization method comprising the steps of:
- at a first authentication token, generating a first dynamic credential by cryptographically combining a value of a first dynamic variable with a first credential generation key that is shared between the first authentication token and an authentication server, wherein said first credential generation key is associated with a specific user;
- receiving, at a second software authentication token that is different from the first authentication token, the generated first dynamic credential;
- deriving, at the second software authentication token, a value for a second credential generation key from the received first dynamic credential;
- generating, at the second software authentication token, a confirmation credential using a cryptographic algorithm parameterized with the derived second credential generation key;
- receiving, at the authentication server, the confirmation credential;
- determining, at the authentication server, a server copy of the second credential generation key;
- validating, at the authentication server, the received confirmation credential using the server copy of the second credential generation key; and
- if said validation of the confirmation credential at the authentication server is successful, associating at the authentication server the determined server copy of the second credential generation key with the specific user, and storing at the authentication server in non-volatile memory the determined server copy of the second credential generation key associated with the specific user.

2. The method of claim 1 wherein the step of validating at the authentication server the received confirmation credential using the server copy of the second credential generation key comprises applying a cryptographic validation algorithm to the received confirmation credential wherein said cryptographic validation algorithm is parameterized by said server copy of the second credential generation key.

3. The method of claim 1 further comprising the steps of: generating at the second software token a second dynamic credential by combining a second dynamic variable with the derived value of the second credential generation key; receiving at the authentication server the second dynamic credential; retrieving at the authentication server the stored server copy of the second credential generation key; verifying at the authentication server the received second dynamic credential using the retrieved server copy of the second credential generation key; generating at the authentication server an authentication signal if said verification of the received second dynamic credential is successful.

4. The method of claim 1 further comprising the step of: using at the authentication server the received confirmation credential for said determining the server copy of the second credential generation key.

5. The method of claim 4 further comprising the steps of: determining at the authentication server a set of possible values for the first dynamic variable; generating at the authentication server for each of the determined possible values of the first dynamic variable a reference value for the first dynamic credential using the first credential generation key; deriving for each of the generated first dynamic credential reference values a candidate value for the second credential generation key; searching at the authentication server among the generated candidate values for the second credential generation key a candidate value with which the received confirmation credential can be validated successfully; if a candidate value has been found with which the received confirmation credential can be validated successfully, determining at the authentication server the server copy of the second credential generation key as a candidate value with which the received confirmation credential has been validated successfully.

6. The method of claim 5 wherein the first dynamic credential generated by the first authentication token and received by the second software authentication token, comprises synchronization data comprising information about the value of the first dynamic variable used in the generation by the first authentication token of the first dynamic credential; and the step of generating the confirmation credential comprises extracting at the second software authentication token the synchronization data comprised in the received first dynamic credential and including the extracted synchronization data in the confirmation credential; and determining at the authentication server a set of possible values for the first dynamic variable comprises extracting at the authentication server the synchronization data included in the received confirmation credential and using the extracted synchronization data in selecting values for the set of possible values for the first dynamic variable.

7. A software token personalization system comprising:
- a first authentication token,
- a second software authentication token that is different from the first authentication token; and
- an authentication server;
- wherein the first authentication token is adapted to generate a first dynamic credential by cryptographically combining a first dynamic variable with a first credential generation key that is shared between the first authentication token and the authentication server, wherein said first credential generation key is associated with a specific user;
- wherein the second software authentication token is adapted to receive the generated first dynamic credential, to derive a value for a second credential generation key using the received first dynamic credential, and to generate a confirmation credential using a cryptographic algorithm parameterized with the derived second credential generation key;
- wherein the authentication server is adapted to receive the confirmation credential, determine a server copy of the second credential generation key, verify the received confirmation credential using the server copy of the second credential generation key, and, if said verification of the confirmation credential is successful, to associate the determined server copy of the second credential generation key with the specific user, and store in non-volatile memory the determined server copy of the second credential generation key associated with the specific user; and wherein the second software authentication token is further adapted to generate dynamic credentials by cryptographically combining a second dynamic variable with the derived second credential generation key.

* * * * *